United States Patent [19]
West

[11] Patent Number: 6,002,473
[45] Date of Patent: Dec. 14, 1999

[54] OPTICAL LEVEL AND SQUARE

[75] Inventor: David Charles West, Floreal, Mauritius

[73] Assignee: Dove-Tec, Inc., Austin, Tex.

[21] Appl. No.: 08/998,321

[22] Filed: Dec. 24, 1997

[51] Int. Cl.$^6$ .................................................. G01B 11/26
[52] U.S. Cl. ............................................................ 356/153
[58] Field of Search .................................... 356/153, 138, 356/154, 139–141.5, 150, 142–149, 152.1–152.3, 247–255; 33/253–255, 261, 276–277, 286; 359/835

[56] References Cited

U.S. PATENT DOCUMENTS

| | | |
|---|---|---|
| 3,655,274 | 4/1972 | Craig . |
| 4,180,313 | 12/1979 | Inviya . |
| 4,348,109 | 9/1982 | Auterson . |
| 4,367,949 | 1/1983 | Lavering . |
| 5,064,286 | 11/1991 | Ai et al. . |

FOREIGN PATENT DOCUMENTS

| | | | |
|---|---|---|---|
| 647464 | 8/1962 | Canada | ................................. 356/250 |

*Primary Examiner*—K. P. Hantis
*Attorney, Agent, or Firm*—Baker & Botts, L.L.P.

[57] ABSTRACT

A method and apparatus for determining an axial relationship by viewing a target with an image inverter and determining the relationship of the optical axis of the image inverter relative to the position of the target by comparing the inverted view against another view. The image inverter can act as level by comparing the inverted image with a direct view of the target, or can measure an angle defined by the first target, the image inverter and a second target offset along a second axis. A mirror associated with the image inverter can provide a reflection of the second target along the reflective axis of the mirror, thus providing a measurement of the angle defined by the intersection of the reflective axis and the optical axis. Each target can comprise a bar, which can divide two contrasting portions to clarify the comparison of the inverted image and the direct or reflected image. The bar can be oriented horizontally or vertically, or at any appropriate orientation to support survey of angles or lines.

19 Claims, 18 Drawing Sheets

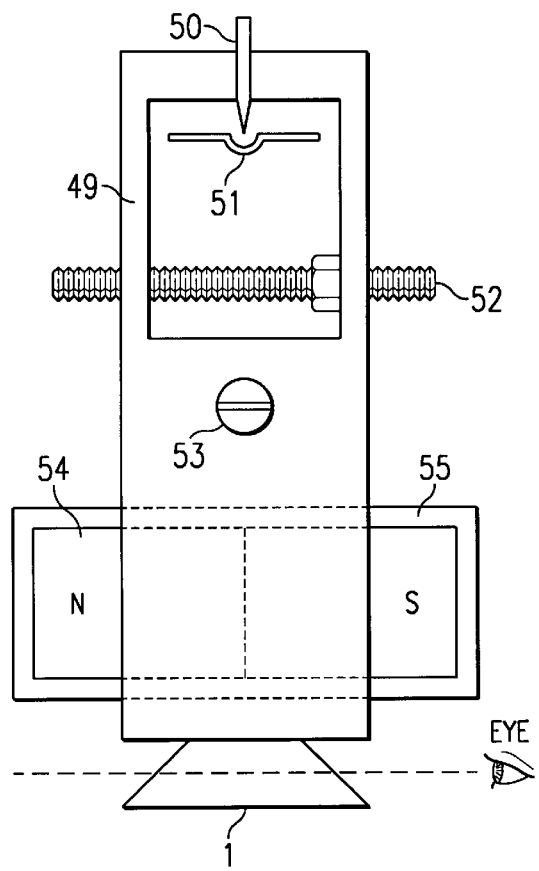
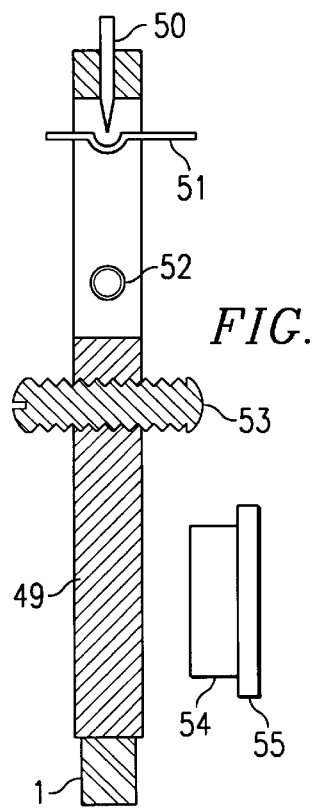
FIG. 15a
FIG. 15b
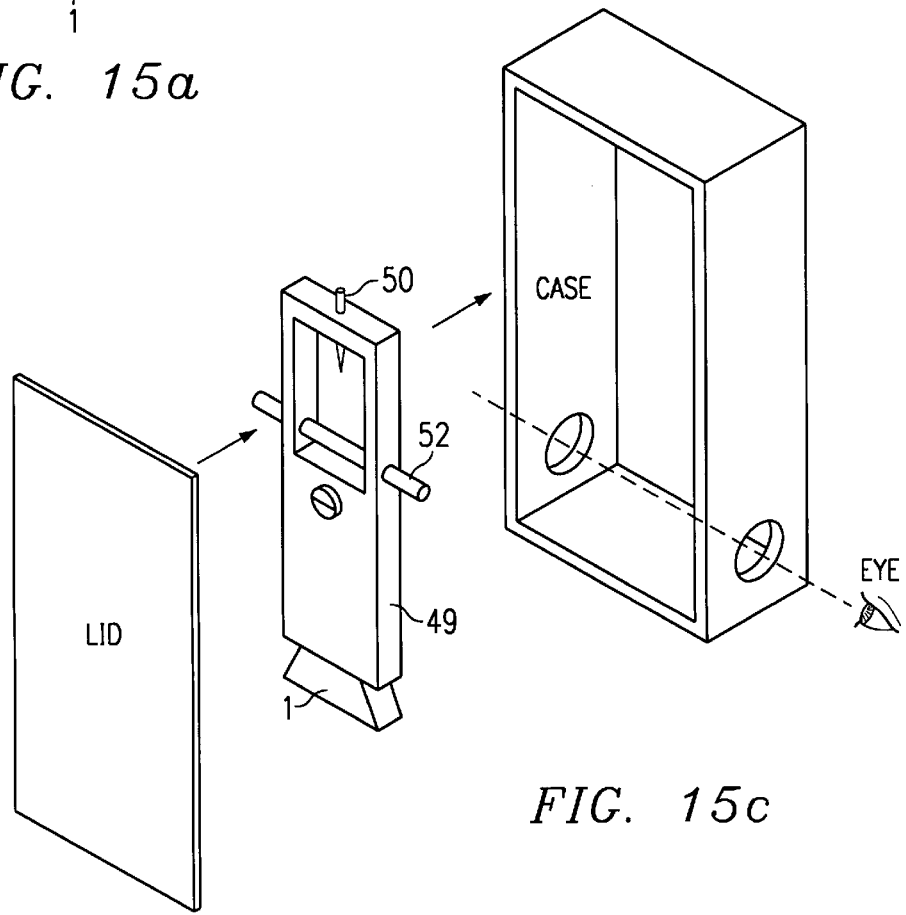
FIG. 15c

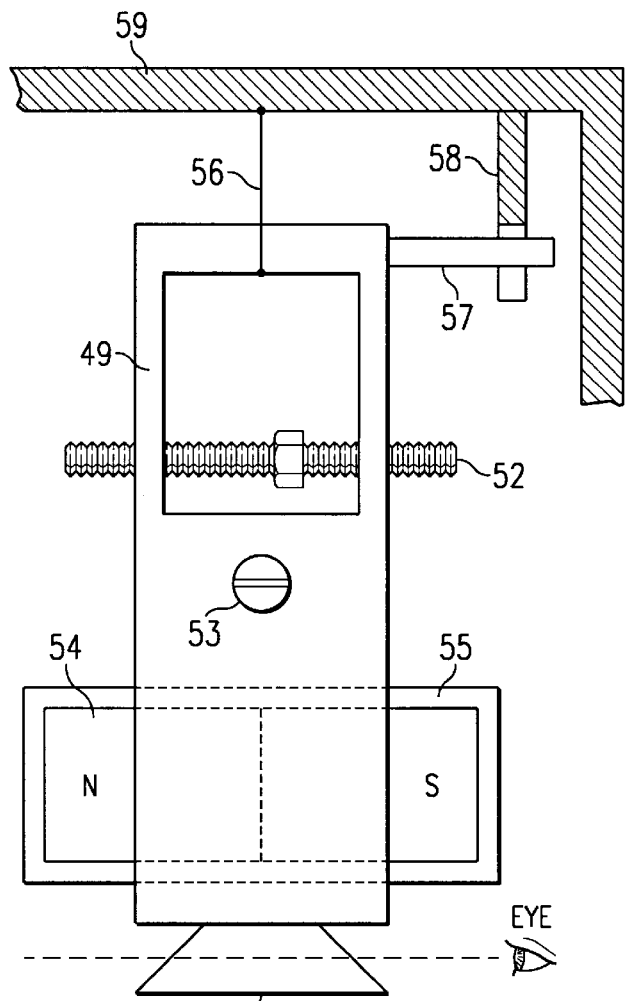
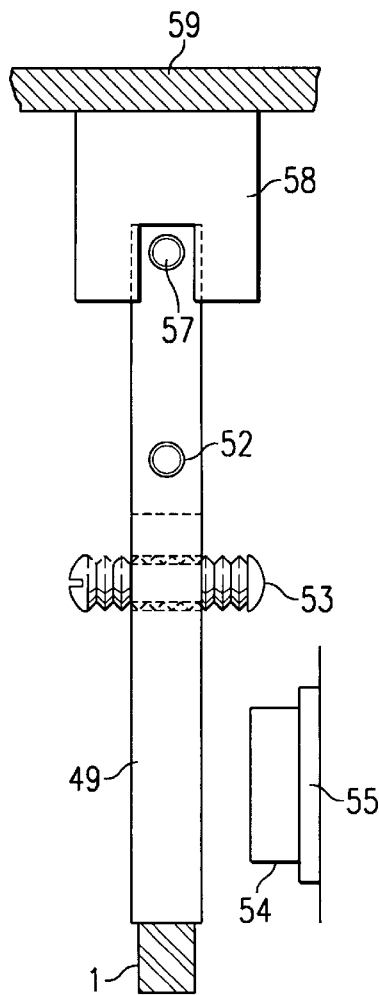
FIG. 16a    FIG. 16b
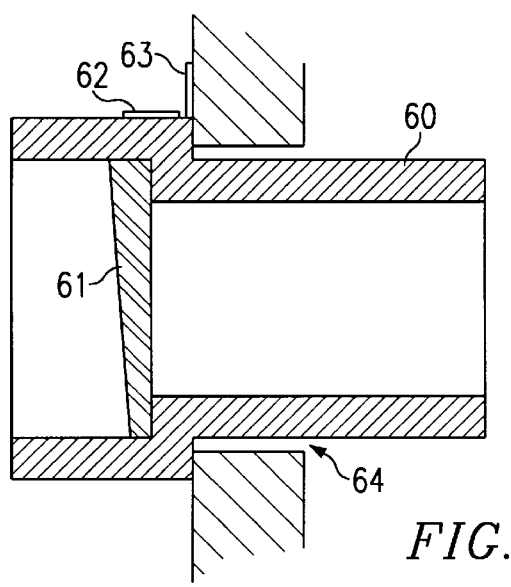
FIG. 17

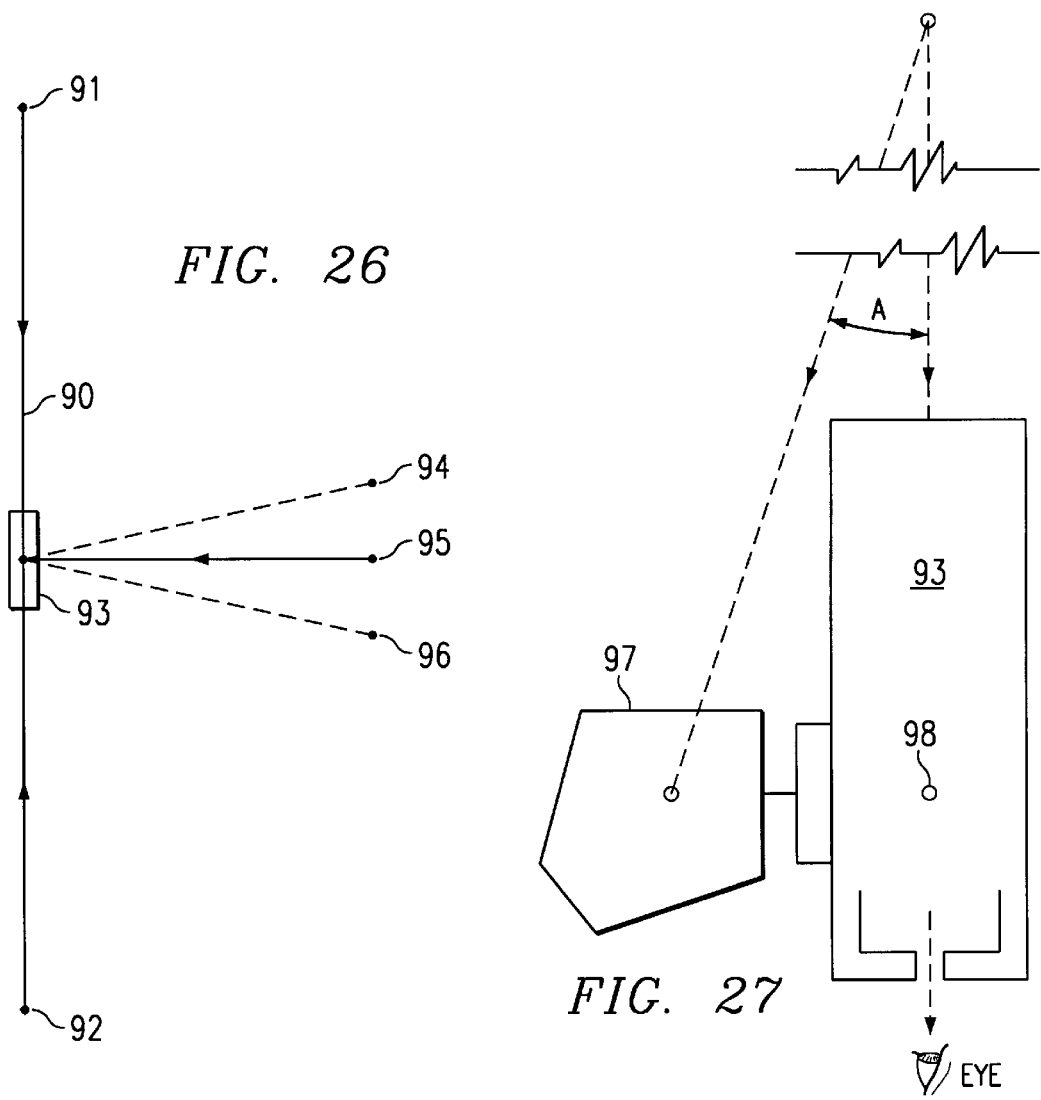
FIG. 26
FIG. 27
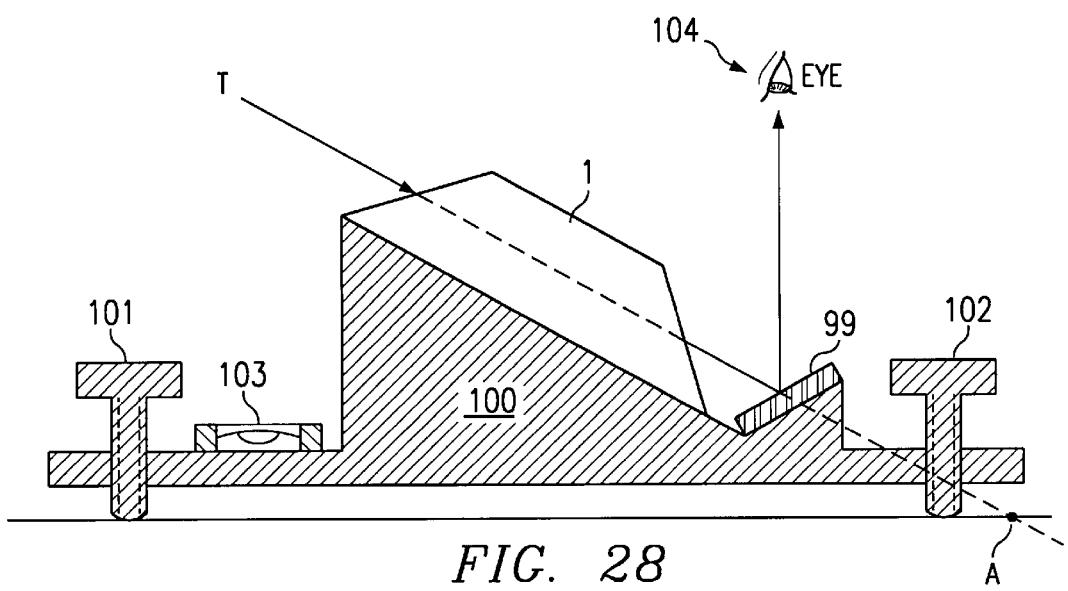
FIG. 28

OPTICAL LEVEL AND SQUARE

TECHNICAL FIELD OF THE INVENTION

This invention relates to the field of surveying equipment, and more particularly to an optical level and square, and to angle checking and alignment devices.

BACKGROUND OF THE INVENTION

Most optical surveying instruments are precision built, and are complex and expensive. They can be difficult to calibrate and set up, and also are not particularly easy to use. There is need for a simpler and relatively inexpensive approach, and one that will provide easy-to-use high-precision instruments, some of which can readily be checked and set up by the user.

SUMMARY OF THE INVENTION

According to one aspect of the present invention there is provided an optical level comprising a see-through optical device with an optical axis, means for suspending said device so that the optical axis lies horizontally, and means for viewing in side-by-side relationship a target directly and through said device along said axis, the arrangement being that such a target not co-horizontal with the axis presents a vertical discontinuity in the composite view.

Preferably, the device will be reversible so that a target can be viewed from either end. This is useful for setting up and checking that it does lie horizontally.

The see-through optical device is an image inverter that provides an inverted view of a target when the target is viewed along the image inverter's optical axis. One convenient such device is a Dove prism. This inverts the target in the base to apex direction, but a point on the target that is located on the optical axis will remain on the optical axis when viewed through the prism. The axial relationship between the target and the image inverter can be determined by comparing the inverted view of the target with a direct view of the target. The optical axis of the image inverter can be determined as co-axial with the target at the point where the inverted view of the target and the direct view of the target align. Thus, a line on a target will appear continuous in a composite view, i.e., when simultaneously viewed directly and through the image inverter, if the line is on the optical axis of the image inverter.

In the simplest form, viewing is by eye at the level of the axis. However, mirrors, prisms or beam splitters can be provided to shift the viewing position, so that the user can look downwards at the instrument, for example.

Also, by the addition of a beam deflecting device the instrument can be adapted to survey slopes and gradients. It can also be adapted to survey verticals. Thus, at the object end of the device there may be a beam deflector which will direct light from vertically above that end horizontally along the optical axis. This may be a flat mirror or a pentaprism, and in either case there may be a compensating prism for fine adjustment when setting up the instrument.

The suspension may be any of a variety of means, a selection of which are described later.

According to another aspect of the present invention, the optical device, which is usually a Dove prism, is suspended or otherwise supported so that its axis is tilted to the horizontal by a known angle. The target is again viewed through and directly alongside the prism, the arrangement being that a target not lying on the axis presents a vertical discontinuity in the composite view. When there is no discontinuity the target lies exactly on the axis of the said optical device. Consequently, the angle from the target to optical device with reference to the horizontal may be checked and if necessary adjusted to be correct. In this aspect of the invention it is usually convenient to use a mirror to shift the viewing position from the axis of the Dove prism so that the user may look downwards into the instrument, for example.

According to yet another aspect of the present invention there is provided an optical square comprising an optical device through which a first target, viewed along its optical axis from a point at one end, appears inverted in the plane of the right angle being surveyed, and light deflecting means through which a second target, viewed from the same point, also appears inverted, the deflecting means being oriented with respect to the optical axis so that, when the targets subtend a right angle at an indicated datum position, they appear in registry at said point. The axial relationship of the first and second target and the optical device can be determined by comparing the inverted view of the first target with the reflected view of the second target.

This inversion will be such that, if the square is rotated about the datum position in the plane of the right angle, the registry of the two targets will not alter. However, any lateral translation, except on the semi-circular arc, will alter the angle subtended so that it is no longer a right angle and this will be immediately apparent.

Again, the optical device is preferably a Dove prism, and the light deflecting means may be a flat mirror. Conveniently this is mounted over half of one face of a Dove prism with a 45 degrees base angle, and the datum position will be at the centre of the reflecting surface of the mirror.

A compensating prism may be further provided to set up the square accurately, and it will remain fixed.

According to yet another aspect of the present invention, two optical devices, usually Dove prisms, are securely fixed together so that they are parallel in the longitudinal plane but at 90 degrees in the lateral plane. This composite device has two optical axes in the form of planes running from the observer's eye towards the target, and these planes are at right angles to each other. The intersection of the planes is a line, and this line constitutes the unique optical axis for the composite device. A target in the form of a ring, disc, crossed lines, or other radially symmetrical figure, is viewed simultaneously through both Dove prisms in the composite device. When the target thus seen appears exactly as it actually is, the optical axis of the composite device is directed precisely towards the centre of the target. The composite optical device may thus be used to establish in space a line of sight from the device to the target put at the desired position, or, from a known and desired orientation of the device, to set a target at its desired position on the optical axis. In either case, intermediate or more distant targets may be set out, which are also on the optical axis of the composite device. In this way, a set of targets may be set out whose centres or other reference points are all co-linear.

BRIEF DESCRIPTION OF THE DRAWINGS

For a better understanding of the invention some examples will now be described, by way of example, with reference to the accompanying drawings, in which:

FIGS. 6 to 16 show various suspension systems for keeping the Dove prism optical axis level;

FIG. 17 is an axial section of a device used to set out known slopes (or gradients) on a survey site;

FIG. 26 is a diagram for explaining a setting-up procedure of an optical square; and FIG. 27 is a further diagram for an alternative setting up procedure;

FIG. 28 is a diagram of an angle checking, or setting out, instrument which makes use of a Dove prism;

FIGS. 29a–d are diagrams of an instrument for aligning targets on a straight line in space, which makes use of two Dove prisms cemented together.

DETAILED DESCRIPTION OF THE INVENTION

Figure 1:
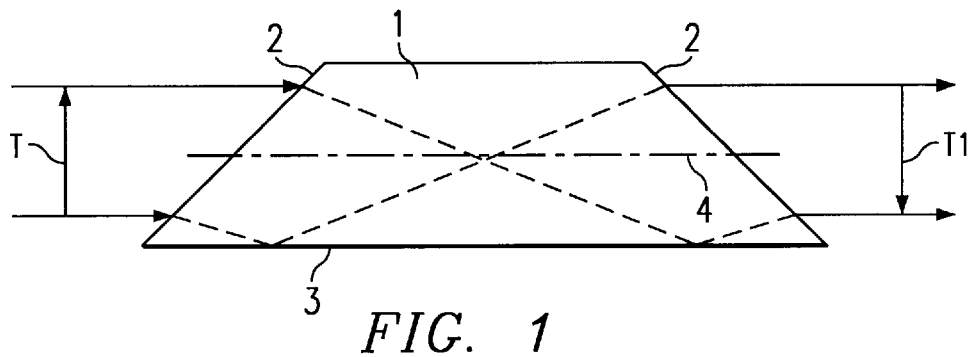
FIG. 1 is a diagram showing the operation of a Dove prism.

The optical levels to be described are based on viewing a target directly, or via a reflecting surface, and through an image inverter simultaneously. There are many image inverters of varying complexity and expense, but the preferred one for present purposes is a Dove prism, as illustrated in FIG. 1.

From the side the prism 1 is of trapezoidal shape, with the ends 2 sloping at 45 degrees to the base 3. High precision of this angle is not essential and about 1.0 degree of arc tolerance is acceptable on each angle. However, it is best if the angles are equal to within 0.5 degrees of arc, while their absolute values can differ from 45 degrees by up to at least 2 degrees. It will be made of optical glass, which will probably have a refractive index of about 1.52. It is desirable that the Dove prism has a pyramidal error, also known as side angle error, of less than three arc minutes, or, in the specific application, such that a vertical target viewed simultaneously through and above, or below, the Dove prism shall appear nearly co-linear in the composite view. If the base 3 is of length X then the sloping ends 2 will be 0.34X approximately and the height 0.24X approximately. It will be understood that different refractive indices, base angles and proportions are possible, all inter-related, but 45 degrees is convenient and most commonly used. It will also be understood that for some and perhaps lower precision applications, Dove prisms made of molded transparent materials may be sufficiently good. The width when viewed end on does not have to be of any specific dimensions, but of the order of 5 mm is convenient in the context of optical levels discussed here. The prism has an optical axis 4, at close to mid-height. The precise height of the optical axis above the prism base (of length X) depends on the base angles and on X, and on the refractive index of the transparent material; given these the prism axis position can be calculated. It will be understood that the optical axis of a Dove prism is a plane close to the mid-height of the prism and parallel to its reflecting base, 3 in FIG. 1.

A target T viewed from the opposite end of the prism along the axis 4 will appear as an inverted image T1. various light paths are indicated by broken lines, and how this inversion occurs can readily be traced. The arrangement is symmetrical and so if the target was T1 the image would be T.

Referring now to FIG. 2, a horizontal sight-rail 5 has contrasting upper and lower halves, the latter being lighter or darker or of a different color. If the prism 1 is set in front of this with its optical axis 4 aligned to meet the junction of the two halves, then an observer looking through and along-side the prism will see what is illustrated at (a). The junction of the two halves is a continuous horizontal line even through the prism, although via the prism the sight rail image is inverted. However, if the optical axis is below or above that junction line, then the observer will see either FIG. 2(b) or FIG. 2(c). The discontinuities labeled +E and –E are easily and immediately apparent.

Figure 2A:
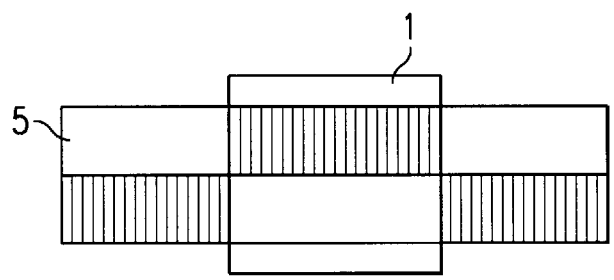
FIGS. 2a–f illustrate views seen through and alongside a Dove prism when used for surveying horizontals or verticals.

When surveying with such sight-rails they will be adjusted vertically until the FIG. 2(a) position is achieved.

Other sight-rail designs are possible, all of which have, as their main characteristic, a horizontal bar on a contrasting background, as shown in FIG. 2 at (d) and (e).

The same types of discontinuity will occur as illustrated in FIG. 2 at (b) or (c), if the prism axis points elsewhere than at the exact centre of the central bar.

Figure 2B:
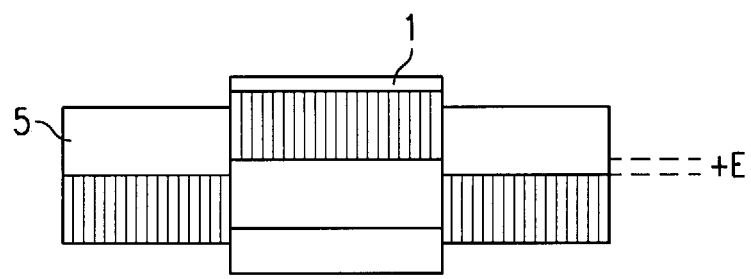
Figure 2C:
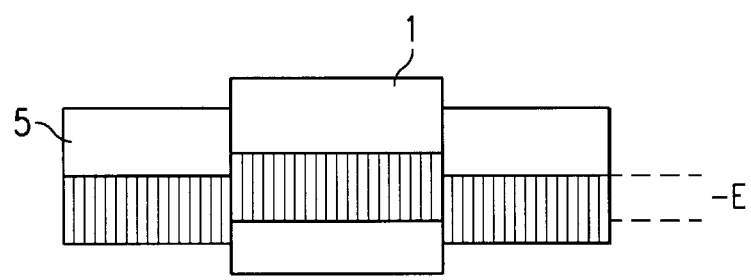
Figure 2D:
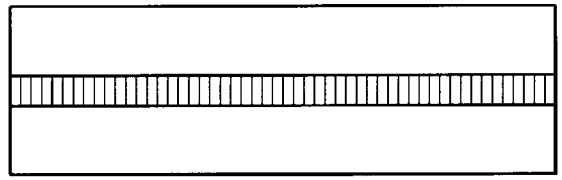
Figure 2E:
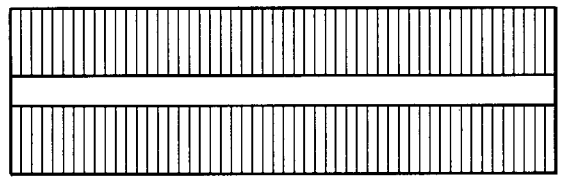
Figure 2F:
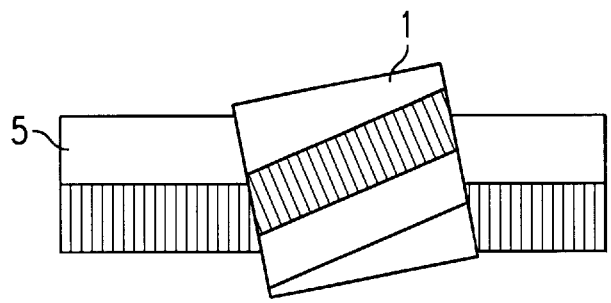

Should the prism 1 be rotated about the optical axis 4 (i.e. tilted laterally) so that the base 3 is no longer horizontal in the lateral plane (at 90 degrees to the viewing direction) then the effect of FIG. 2(f) is obtained. As the prism rotates through an angle A, say, in any direction or manner except in a plane parallel to its base 3 so the image rotates through the angle 2A, thus making it sensitive to such rotations.

Leveling the prism to remove this tilt may be easily achieved by means to be described below.

Figure 3:
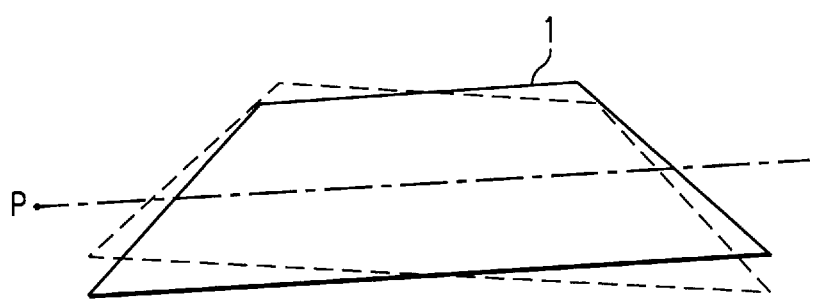
FIG. 3 is a diagram for explaining the effect of tilt of the optical axis of a Dove prism.

For setting out horizontals on a site, for example, it is also necessary for the axis 4 to be precisely horizontal, and this can be checked by reversing the prism to observe the target successively through both ends. Referring to FIG. 3 it will be assumed that the prism is mounted on a suspension system which tilts its optical axis down slightly towards one end, as illustrated in full lines, with the tilt exaggerated.

Looking through the prism in this attitude, a target point P might be assumed to be level with the device if a view like that in FIG. 2(a) is seen. However, by turning the instrument through 180 degrees about the vertical, the prism will assume the dotted line position and the point P will then appear well off the optical axis and give the views as at FIG. 2(b) or FIG. 2(c). Again, adjustments as described below can be made to the target height and to the prism suspension so that the tilt of the optical axis of the prism is removed and such that a level target point P will appear the same whichever way it is viewed through the prism.

If the prism axis is not set to be exactly horizontal in the direction of the target, viewing one way around will give an "error" of +E, as in FIG. 2(b), while with the instrument reversed the error will be –E as in FIG. 2(c). The exact position of horizontality is mid-way between +E and –E. Thus this type of level is usable with full accuracy, even if not calibrated, and this is a unique feature. The prism must, however, be set up properly laterally, or the "chevron" effect of FIG. 2(f) will occur, reducing accuracy. Should the sight rail itself not be exactly horizontal, the "chevron" effect of FIG. 2(f) will be seen, even if the prism is properly set up laterally. Exact horizontality of the sight rail is easily achieved by fixing it at right angles to a rule, on which it can be moved up or down as needed. The said rule may be suspended as a pendulum, for example by means of a nail passing through a hole in the upper end of the rule, said nail being fixed into a support, such as a pole or a wall.

Observing horizontally along the optical axis may not always be convenient, and provision can be made for viewing vertically downwards, as shown in FIG. 4.

Figure 4A:
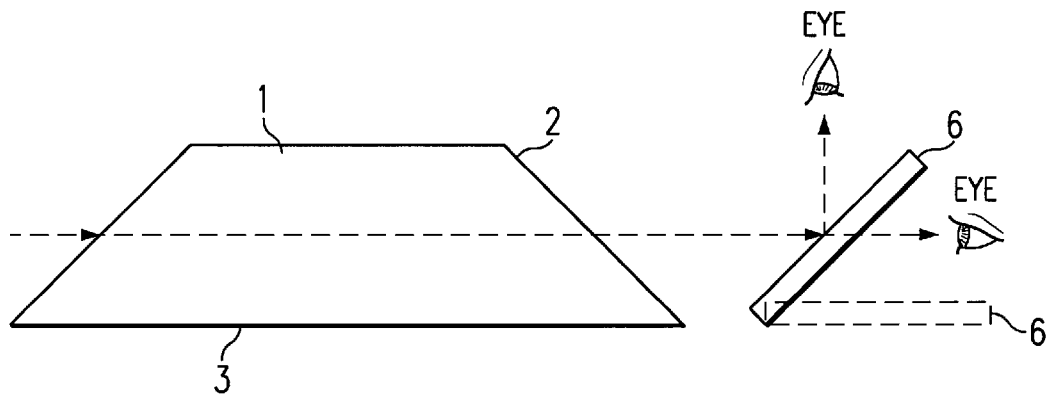
FIGS. 4a–c show a Dove prism with various accessories for vertical viewing when used to set out horizontals.
Figure 4B:
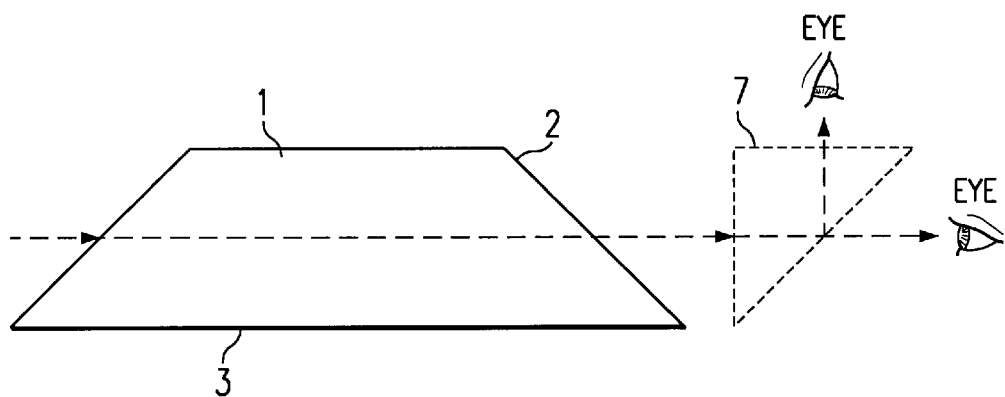

In FIG. 4(a) a mirror 6 wider than the prism to provide a view along each side is provided at one end and can be set by detents at either the full line position or the dotted line position. In the former, it is angled at 90 degrees to the adjacent prism end 2, which simply shifts the viewing position to the point illustrated by the eye. When the mirror is in the dotted line position it is effectively removed, and then horizontal observations are used. The same effect can be achieved by a removable right-angled prism 7 as illustrated in FIG. 4(b). Both the mirror 6 and prism 7 will use fully reflecting surfaces, losing perhaps 10% of the light, which is negligible. Preferably they will be mounted on a housing inside which the Dove prism is suspended, and they can be optional accessories to fit to a basic instrument, although not to the system suspending the Dove prism.

Figure 4C:
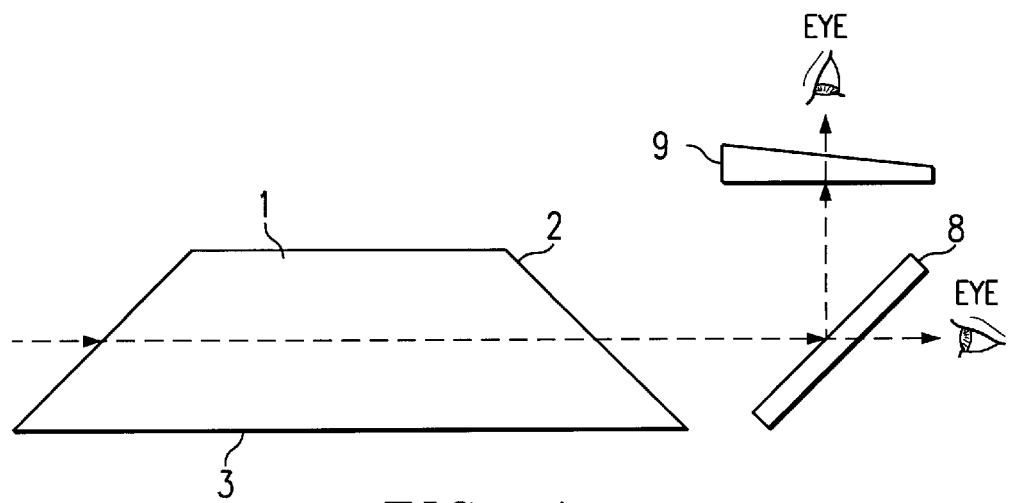

FIG. 4(c) shows a third alternative in the form of a beam splitter 8. This can be permanently mounted to the Dove prism suspension system since it is not moved, although it could be fixed to the surrounding housing. It allows for horizontal and vertical viewing simultaneously, or at least without adjustment, and although it will involve 50% light loss, that is acceptable under most conditions. It should be sufficiently flat and have parallel enough surfaces so as not to cause deviation of light by more than 0.2 minutes of arc at most, if the beam splitter is required to be left in place, or is permanently fixed to the Dove prism suspension and the accuracy of the instrument is to be checked by reversal.

Also shown in FIG. 4(c) is a compensating prism 9. This is of shallow wedge shape and by rotating it the effect is gradually to alter the angle from which light appears to come. In FIG. 4(c) it effectively alters the angle of the beam splitter 8 (or it could be of mirror 6 or prism 7) with respect to the optical axis of the Dove prism so that exact 90 degree deviations in the optical path can be obtained. It is not really needed for surveying horizontals with vertical viewing since it affects direct rays and those through the prism equally, and in this context it is a dispensable "extra." However, it has an important function in surveying verticals, as described below. The prism 9 must then be fitted to the same body carrying the beam splitter 8 and the Dove prism 1, so that 8, 9, and 1 are rigid together.

As well as surveying horizontals, the instrument can readily be adapted to surveying verticals, and examples are shown in FIG. 5.

Figure 5A:
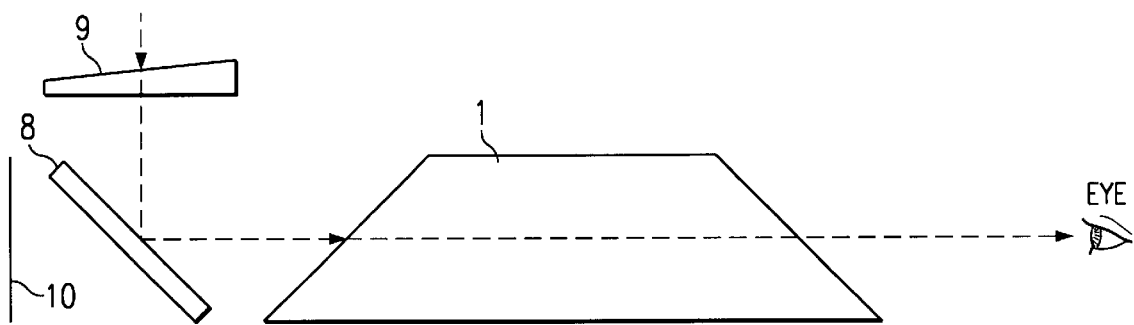
FIGS. 5a–b show a Dove prism with various accessories when used for setting out verticals.

FIG. 5(a) is essentially the same as FIG. 4(c) and is referenced correspondingly, although the observation is made horizontally from the opposite end. In addition, there is placed behind the beam splitter 8 a mask 10 to block out the direct view ahead and to present the vertical view without interference and loss of contrast due to the direct view. The mask 10 is fixed to the instrument case, and not to the body carrying 8, 9, and 1 rigidly together. The compensating prism 9 is rotated to and fixed at the position which has the optical effect of putting the surface of the beam splitter at exactly 45 degrees to the optical axis of the Dove prism and thus deviating the axis of the system upwards by exactly 90 degrees. In actuality, it sets the optical axis of the Dove prism and the vertically "reflected" optical axis above the compensating prism 9, at 90 degrees exactly. Thus, assuming the Dove prism optical axis to be horizontal, a target vertically above the beam splitter 8 and exactly on the vertical projection of the optical axis appears through the prism in the line of vision, giving a view like that in FIG. 2(a).

To establish a lower point of reference, once the compensating prism 9 is set, a diametral line may be indicated adjacent to it corresponding to the reflection of the optical axis, or rather the vertical plane which contains that axis.

As described below, the prism 1 will be in a very free, accurate and damped suspension, and the compensating prism 9 will shift laterally with respect to the housing if the latter is out of vertical. Therefore, to set up the instrument for easy and precise readings, a bubble level may be fixed to the housing, to enable the latter to be set upright. With this provision, the lower reference line may be indicated on top of the housing, for example on each side of a window overlying the prism 9. This line on the instrument will be directly above the diametral line on the prism 9 to within about 0.5 mm, and so that housing mark can be used as a lower reference point. By setting out two or more verticals above the device there is no need to use the diametral lines and housing tilt is of no importance. As noted in relation to FIG. 4(c), items 1, 8, and 9 are mounted on the same body so as to be rigid together.

Figure 5B:
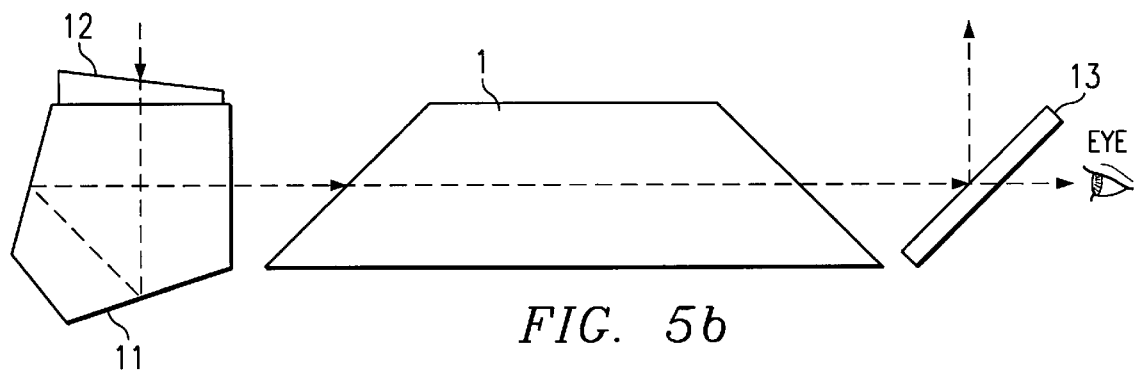

An alternative is shown in FIG. 5(b) where, instead of the elements 8, 9 and 10 there is a pentaprism 11 to which is adhered or otherwise attached a compensating prism 12. This is set so that the deviation is within 0.2 minutes of arc of 90 degrees. The prism 12 can be adhered by any of a range of optical adhesives which do not introduce strain into the optical components. The assembly 11 and 12 is fixed to the external housing of the instrument and is intended to be a removable accessory. This also relieves the Dove prism suspension system of extra weight. At the other end there is an optional beam splitter 13. Even without the beam splitter 13, the prism assembly 11, 12 can be used for vertical viewing when surveying horizontals (as in FIG. 4(b) in effect) and hence does the job.

The instrument depends on the optical axis of the Dove prism being held precisely horizontal, or at some constant small angle to the horizontal as noted above in the last paragraph of the section discussing FIG. 2, and various ways of achieving this are diagrammatically illustrated in FIGS. 6 to 14.

It will be understood that in order to avoid lateral tilting and the consequent views as in FIG. 2(f), the Dove prism must be level in all planes and not only in the viewing direction. This is achieved by the pendulum carrying the Dove prism being free to move in all planes so that the Dove prism is automatically self leveling in all planes, unless otherwise stated.

Figure 6:
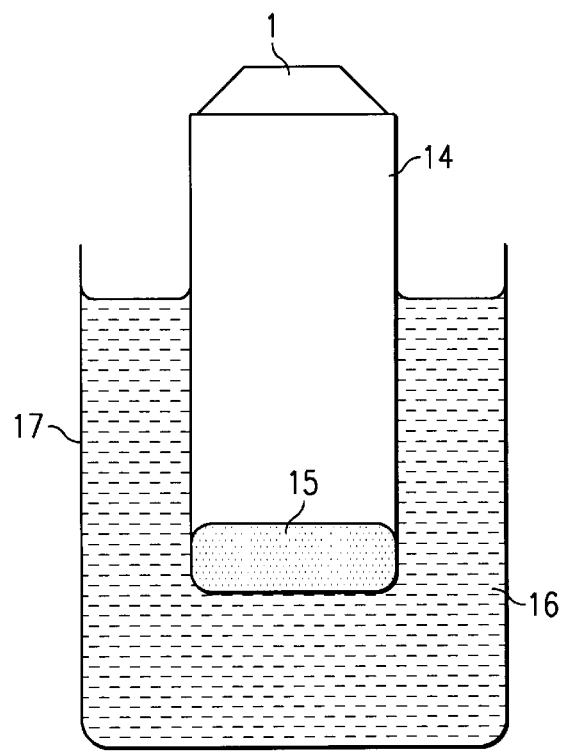

In FIG. 6, the Dove prism 1 is mounted on a buoyant body 14, ballasted with a weight 15 at its lower end. The body floats in a fluid 16 in a container 17 with the Dove prism about 1–2 cm above the fluid surface and should the container be set down skew, then the body 14 will still float upright with the prism level.

Figure 7:
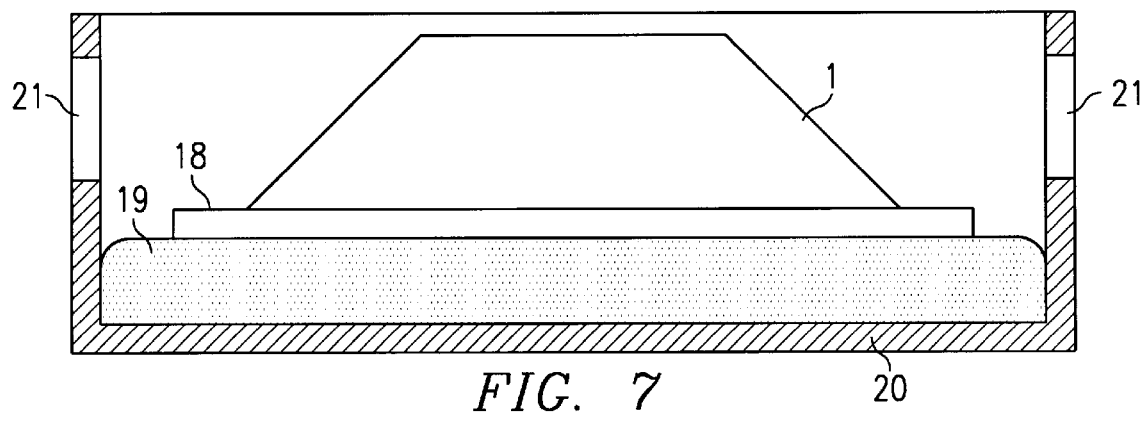

A modification of this is shown in FIG. 7, where the Dove prism 1 is mounted on a plate 18 which floats on top of a bath of mercury 19. This is contained in a shallow container 20 with viewing windows 21 aligned with the prism. The container will be totally closed to contain the mercury safely and there would be further windows for vertical viewing with horizontal surveying if a beam splitter is permanently fixed to the plate 18.

Figure 8:
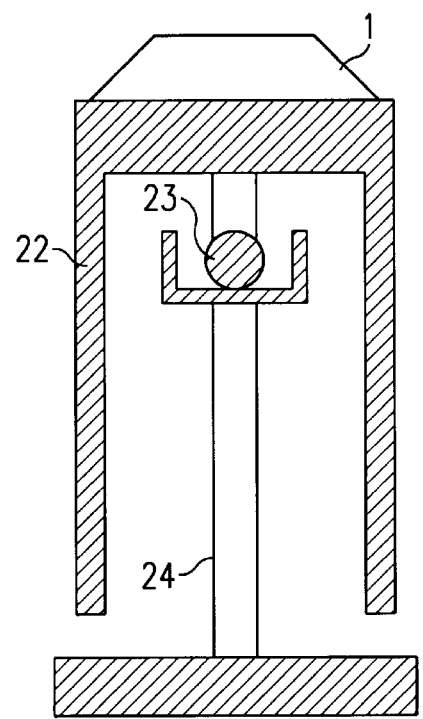

In FIG. 8, the Dove prism 1 is mounted on top of an inverted cup-like member 22, which has a small diameter spherical bearing 23 centrally and high up within it. This seats at the top of a column 24, and the centre of gravity of the assembly 1, 22 and 23 is well below the bearing 23, making it stable and the prism nearly level even though the column 24 may tilt, although for high precision a second intermediate pendulum system should be introduced. However, if the ball is of very small radius it becomes nearly a point, and one obtains the unipivot type of suspension, described below in relation to FIG. 15.

Figure 9:
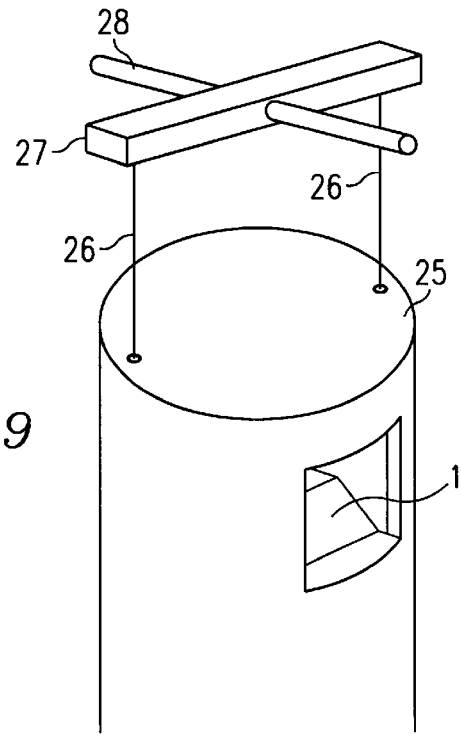

In FIG. 9 the prism 1 is mounted in a body 25 suspended by filaments 26 from the end of a beam 27. A rod 28 extends transversely through this beam and is pivotally suspended at its ends or in the beam 27.

Figure 10:
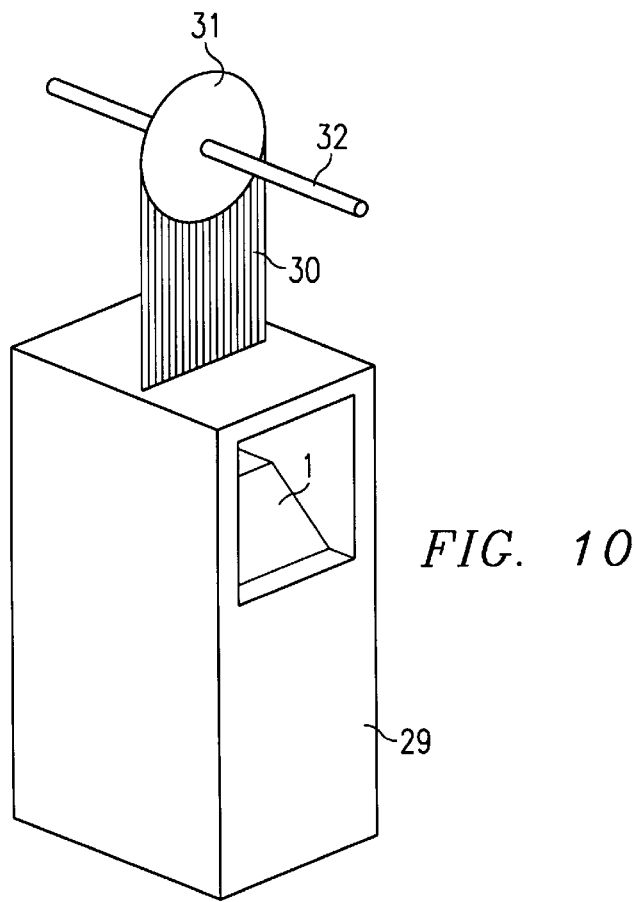

A somewhat similar arrangement is shown in FIG. 10 where the prism 1 is carried by a body 29, which is suspended by means of a thin flexible sheet 30 from a member 31, disc-shaped in this example. A rod 32 extends co-axially through this member, which can rotate about it or, alternatively, the rod may be fixed into member 31 and be pivotally suspended at its ends.

Instead of using two filaments to support the body 25, as in FIG. 9 it is also possible to support the body using one filament only. This provides a suspension which is fully automatically self-leveling in all planes. A constraint in azimuth is required, and an example is described below in relation to FIG. 16.

Figure 11:
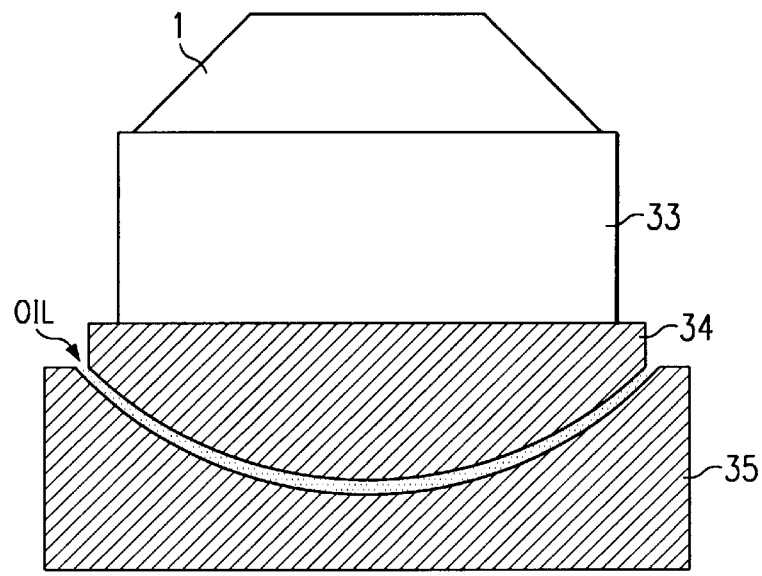

In FIG. 11 the prism 1 is mounted on a heavy block 33 with a base 34 having a part spherical under surface. With the interposition of an oil film this seats in a correspondingly spherical cupped member 35 having the same radius of curvature as 34. In practice matching spherical surfaces can be made in many materials. To counteract settlement of the prism assembly, which after some minutes tends to push the oil out, provision may be made to injecting oil into the gap from time to time.

It will be understood that although they may appear from the diagrams to be free, the Dove prisms will be subject to restraint in azimuth, to keep them aligned with viewing windows in the housing.

Figure 12:
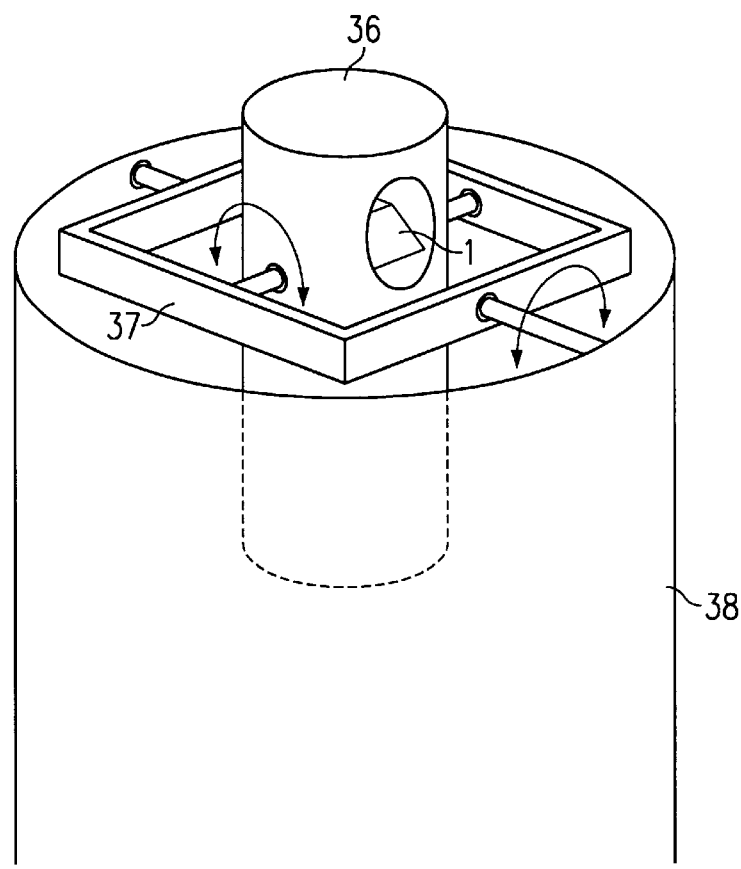

In FIG. 12 the prism 1 is mounted in a body 36 which has a gimbal suspension 37 within a housing 38.

It will be understood that apart from the methods shown in FIGS. 6, 7, 8, 11, 15 and 16 which are fully automatically self-leveling in all planes, and hence do not require independent suspension of the pendulum for the viewing and lateral directions, the designs shown in FIGS. 9, 10, and 12 do have independent provision for the pendulum to swing in these directions and thus to become properly level.

In this context, it will be further understood that, apart from specific methods such as the filaments 26 of FIG. 9, or the sheet 30 of FIG. 10, the pivoting of the pendulum may be done in various and perhaps combinations of ways.

Hence, the lateral pivots of FIG. 9 (items 27, 28) or of FIG. 10 (items 31, 32) may be of any convenient type, including plain bearings, or ball-races, or filaments, or sheets, or knife-edges, for example.

Hence, in the gimbal design of FIG. 12, the pivots shown diagrammatically are shafts, but in practice it is usual to provide very free pivots which can here conveniently be small ball-races or knife-edges. Again, for a gimbal, it is possible, whatever pivot or suspension method is used, whether of the same types or not, to use four, three, or two pivots as long as there is a pair of axes at 90 degrees.

It will be further understood that although it is desirable to provide a fully automatically self-leveling pendulum so that the target views as shown in FIG. 2(f) are avoided, in all suspensions so far described, except those which by their nature are fully automatic (FIGS. 6, 7, 8, 11, 15 and 16), it is possible to make an instrument which is automatically self-leveling only in the direction of view, but not automatic laterally. In such cases, the pendulum suspension is simpler, but means must be provided on the stand for the instrument, perhaps with adjustment screws, for leveling the instrument laterally.

With the exception of FIGS. 6, 7 and 11, these arrangements may be somewhat unstable, or at least the body carrying the prism will tend to oscillate too freely. It will therefore be advisable to provide some damping, and one of several possible solutions is diagrammatically shown in FIG. 13. The prism 1 is mounted on a body 39 suspended at 40 and the freedom of motion transverse to the plane of the drawing will be assumed also to exist. The prism assembly is contained in a fluid-tight housing 41 with windows 42 aligned with the prism and providing a field of view wider than that prism. The lower end of the body 39 is immersed in a liquid 43 which provides effective damping of any oscillations. The housing 41 may be fitted to any convenient tripod by means of a threaded socket 44, but it is emphasized that these instruments can generally stand alone on any firm surface, and that all suspension methods level the Dove prism automatically in all planes.

In order to confine the liquid to the lower part of the housing when it is dismounted from the tripod, or when the instrument is out of use or in transit, and to prevent contamination of the surface of the prism 1, a non-spill skirt 45 is provided around the inside of the housing 41. All the liquid is contained within the cavity between the skirt 45 and the housing 41 however the latter be orientated.

Figure 13:
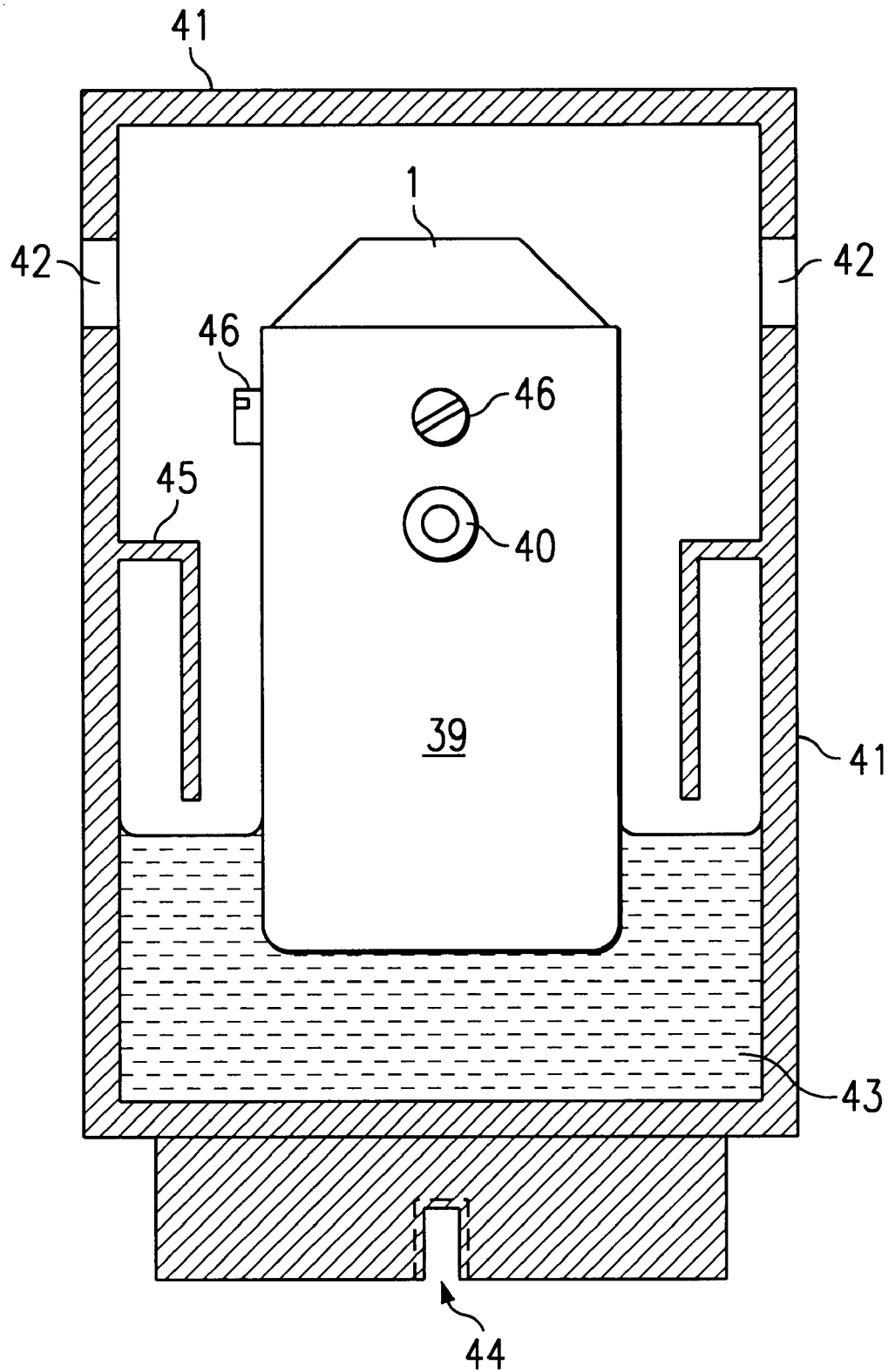

In order to set the axis of the Dove prism 1 level, the body on which it is carried can be provided with adjustable weights. In FIG. 13 these are illustrated as screws 46 which can be set further in or out from the body 39 and then locked up and left when an exact level is achieved. The previous and later described embodiments may all be equipped with something similar.

An alternative and generally preferable method of damping pendulum oscillations is by the use of magnets which induce eddy currents into a non-ferrous but conductive pendulum which must be almost totally non-magnetic. If the pendulum moves so as to cut the lines of magnetic flux, the resulting eddy currents set up their own magnetic field which, interacting with the applied field, oppose the motion of the pendulum and provide efficient damping.

Figure 14:
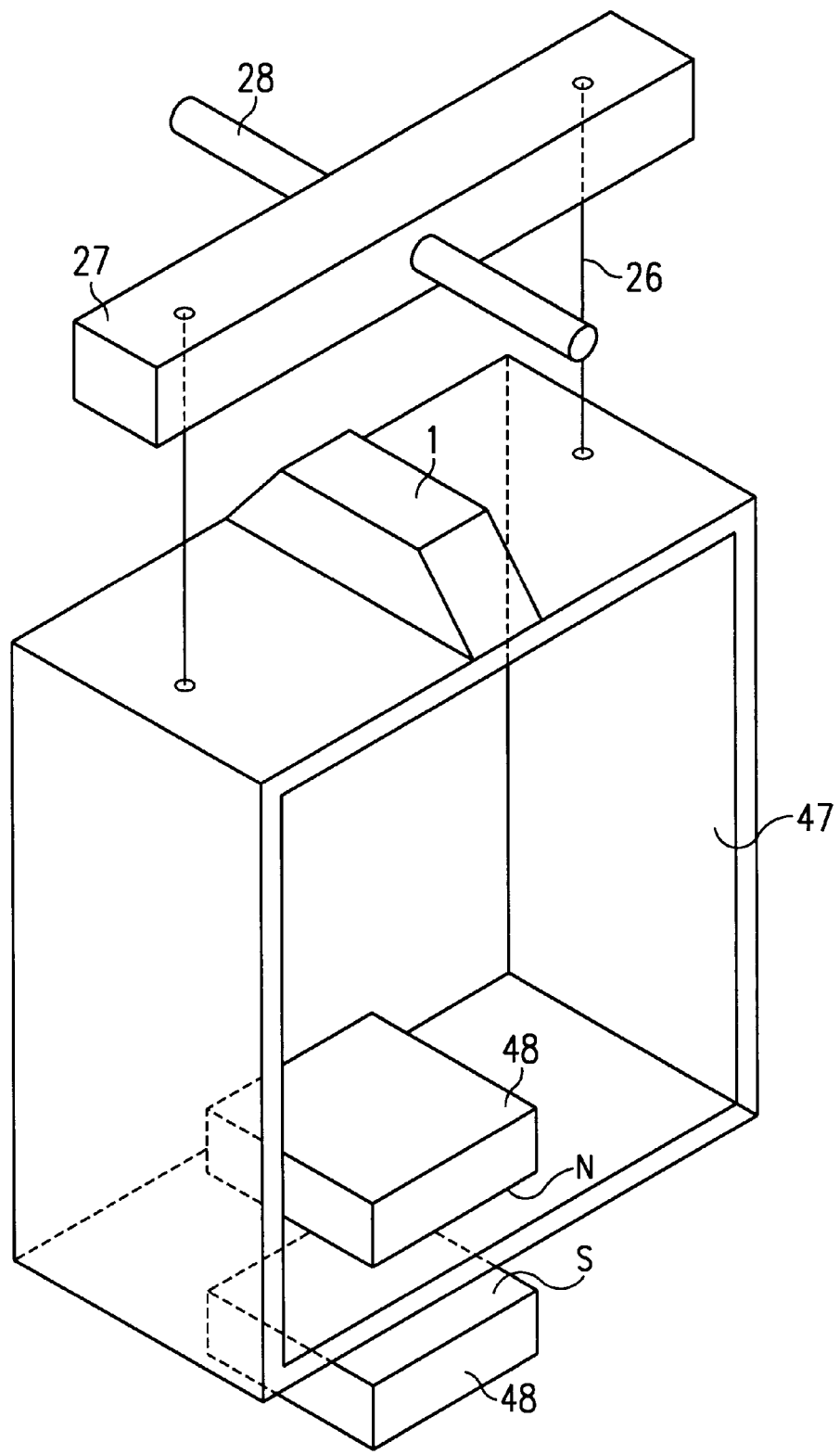

One way of providing magnetic damping for a fully automatically self-leveling pendulum is shown in FIG. 14. The pendulum 47 is a rectangle of aluminum, for example, on top of which the Dove prism 1 is fixed, the whole being suspended by the filaments 26 and the lateral pivots 27, 28.

The lower part of the pendulum passes between the poles of magnets 48 whose opposite poles face each other. It will be understood that an iron yoke-piece (not shown) may be provided to link the uppermost and lower-most faces of the pair of magnets, in order to increase the efficiency of the method, or that more complex arrangements of magnets may be used to the same end. Motion of the conductive pendulum 47 in the gap between the magnets 48 leads to effective damping and the pendulum comes rapidly to rest.

It will be understood that many ways exist for achieving damping in the present context, and that a rectangular pendulum is not necessarily required. In this context see FIGS. 15 and 16 below.

FIG. 151 shows a "unipivot" uspenqion which is the best mode of practicing the invention for an optical level. The Dove prism 1 is adhered tightly to a non-ferrous metal bar 49, which can be of aluminum, for example. A hardened steel cylindrical pivot pin 50 has a sharpened point which rests in a cupped support 51, also preferably hardened, and fixed inside the case of the instrument. The unit comprising of 1, 49, 50, and 51 may conveniently be termed an "optical pendulum." Pendulum balance in mutually perpendicular planes is achieved by adjusting the balance weights 52 and 53, which may conveniently be threaded shafts provided with lock-nuts. Any unipivotally suspended pendulum is free to rotate in azimuth and such rotations have to be constrained in order that a view of the sight rail is maintained through the Dove prism 1. Although such constraint is not shown in FIG. 15 a method similar to that described in relation to FIG. 16 and involving an azimuth constraint peg on the pendulum and a slotted vane on the instrument case can be employed.

Pendulum oscillations in all planes are damped effectively by a pair of magnets 54 glued to a flux-linking iron plate 55. As shown the two magnet poles facing 49 are different. By adjustment of 52 and 53 the direction in space of the Dove prism optical axis can be altered to give the view of a sight-rail as shown in FIG. 2(*a*), for example. The lower part of FIG. 15 shows diagrammatically how the complete optical pendulum 1, 49, 50, 52 and 53, may be inserted sideways into a case provided with viewing windows, after which the case is closed by the lid. Although not shown, the magnet assembly 54 and 55 is fixed into the inside of the case before the pendulum is inserted, as is the support cup 51. In order to avoid shock-induced damage to the pivot pin 50 and the support cup 51, the latter may be held in a sprung suspension, such that it can deflect downwards, so avoiding any excessive forces between 50 and 51. In addition, provision can be made to lift the optical pendulum off the support cup 51 completely, and to lock it securely within the case while the instrument is not in use, for example when it is in transit, thus completely avoiding damage due to shock forces.

By a simple modification of the embodiment shown in FIG. 15 the Dove prism 1 may be fixed to either the top or the bottom of the metal bar 49, the viewing windows of the instrument case being situated appropriately.

FIG. 16 shows a single filament pendulum suspension this being the second best mode of practicing the invention. The Dove prism 1, the non-ferrous metal bar 49, the pendulum balance screws 52 and 53, and the magnetic damping system 54 and 55 are all as described above in relation to FIG. 15 concerning their form and operation, and are referenced correspondingly.

The optical pendulum consisting of items 1, 49, 52 and 53, is suspended from the outer instrument case 59 by a single filament 56, which may be a piece of a fine monofilament fishing line, or a small diameter multi-fibre string, for example.

Azimuthal rotations of the pendulum are prevented by means of a rod 57 fixed to the top of 49 and passing through a slot in a vane 58 fixed to the outer case 59.

It will be understood that the Dove prism optical levels shown in FIGS. 15 and 16 are fully automatically self-leveling in all planes, with oscillations of the pendulum being well damped by the magnet assemblies 54 and 55.

As well as surveying levels, it is often required to survey shallow slopes or gradients, and the instruments described above can readily be adapted to do this by the "gradient accessory" of FIG. 17. This comprises a thin prism 61 in a housing 60. It plugs into a socket over the far viewing window 64 of the instrument case, i.e. that towards the survey point, and can be rotated so as to tilt the composite optical axis up or down in a graduated manner. Conveniently it has a scale 62 on its exterior surface which co-operates with a mark 63 on the instrument housing. By this means the incline can be read off directly. The gradient accessory housing may have an indexing adjustment "clicking" between suitably spaced detents.

In order to cater for various ranges of slopes there may be a set of such gradient accessories, each with a different prism angle, from which the appropriate one can be selected and fitted.

With all optical levels and modifications so far described, to improve the ease and accuracy of observation a small telescope can be used to view the target through the levels. It is generally satisfactory for the telescope to have a magnification of about five, and it is of no consequence whether the telescopic image is erect or inverted.

Figure 18A:
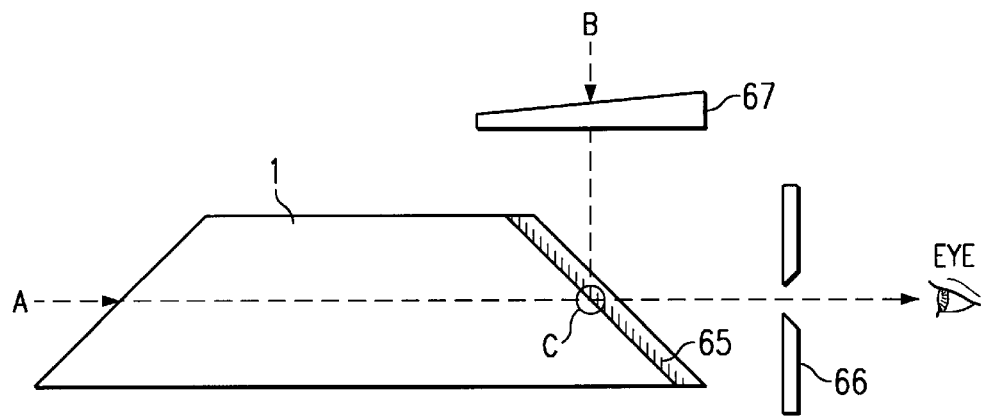
FIGS. 18a–b show diagrams of an optical square, using a Dove prism to survey right angles.
Figure 18B:
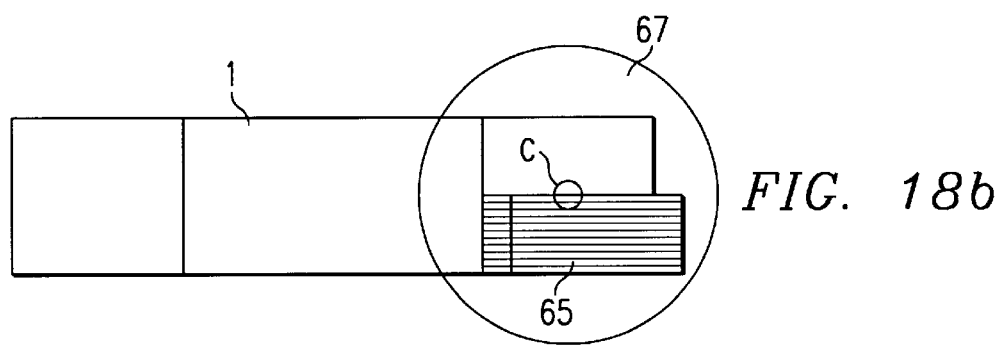

Another basic surveying job is to check or to set out right angles, and an instrument referred to herein as an optical square and incorporating a Dove prism is diagrammatically shown in FIG. 18. The prism 1 has the observer's end provided with a mirror 65 over half its width as best seen in FIG. 18(*b*). This mirror may be a reflecting element adhered to the end face, or that end face may be metallized by vacuum deposition, for example.

If the Dove prism optical axis and its mirror meet exactly at 45 degrees then an observer looking though aperture 66 would see an object at A within the direct view allowed by the prism but not necessarily on its optical axis, inverted in the usual way through the non-mirrored half. An object at B subtending with A a right angle at the point C of the half-mirrored end face will also be observed via the mirror 65 through the eyepiece 66, and will appear laterally inverted and coincident with A.

In practice, the square is principally used for setting out right angles in the horizontal plane, e.g. on a building site. (However, right angles may be set out in any plane.) Thus the Dove prism is rotated such that the base to apex direction is horizontal. In this case the inversion of A looks like a lateral inversion, as does that of B, and the images of A and B are still coincident, if A and B subtend 90 degrees at the rear face of the prism. Again in practice, targets A and B would be white rectangles, each having a central black line, as described later. When these black lines coincide, the angle "line on A, via point C on the rear Dove prism face, to line on B," is 90 degrees.

Sufficiently precise manufacture of the Dove prism, such that its base angles are exactly 45 degrees, is not always possible and so a compensating prism 67 will generally be provided. In FIG. 18 it is set to one side, in the light path to the mirror 65. It will then not affect the image along the optical axis, but it can be rotated to affect the image from the object B. A method for setting this up so that the angle ACB is 90 degrees is described below.

Figure 19:
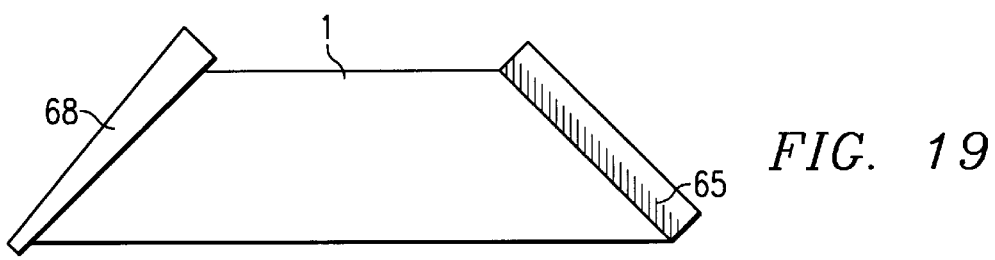
FIGS. 19 and 20 show modifications of the square of FIG. 18.

In FIG. 19 a compensating prism 68 is adhered or otherwise attached to the object end of the Dove prism 1 where it will bend the optical axis so that it is exactly at 45 degrees to the surface of the mirror 65. It will not affect the image reflected by that mirror, which may be adhered to the other end face. Adjustments to the compensating prism 68 are made before the setting of the adhesive attaching it to the Dove prism 1. As an alternative, the compensating prism 68 need not be adhered to the Dove prism 1, but may be held in front of the object end inclined face of 1, approximately perpendicular to the Dove prism axis, such that it, 68, may be rotated to the correct position and then locked in place. An example of this is described in relation to FIG. 25.

Figure 20:
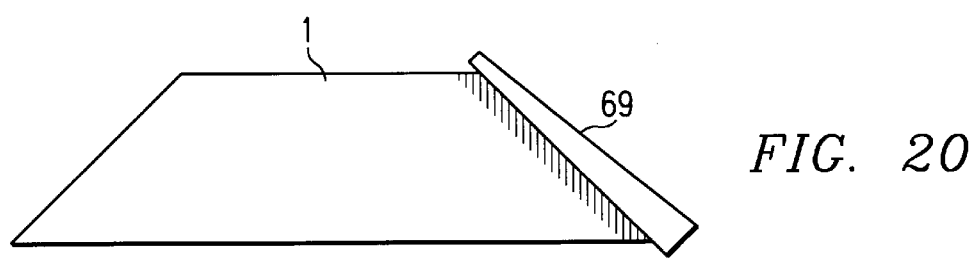
Figure 21A:
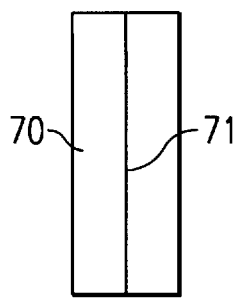
FIGS. 21a–d illustrate one type of target which can be used and images appearing when operating with such squares.
Figure 21B:
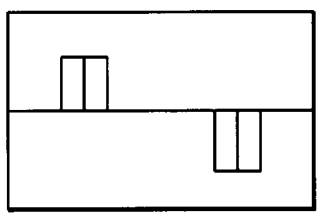
Figure 21C:
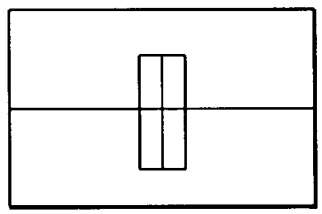
Figure 21D:
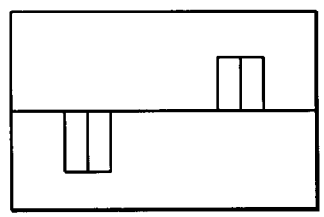

A further alternative is shown in FIG. 20 where a compensating prism 69 is adhered over the mirrored end face of the Dove prism 1, the mirroring being provided by a metal deposition which is subsequently protected by the prism 69. Here the prism 69 will affect both light paths, but differentially since that from the transverse object B will pass through twice with an intermediate reflection whereas that from object A will pass through once. The method shown in FIG. 20 is only satisfactory if errors in the Dove prism are small.

FIG. 21 illustrates how surveying may be carried out with such an instrument. At (a) there is shown a suitable target to form both objects A and B. This is a vertical board 70 with a prominent vertical stripe 71. Alternatively, a target of the form indicated in FIG. 2 can equally well be used. FIGS. 21(b), (c) and (d) respectively show what an observer sees when the target angle ACB (see FIG. 18) is greater than 90 degrees, 90 degrees exactly, and less than 90 degrees.

Figure 22:
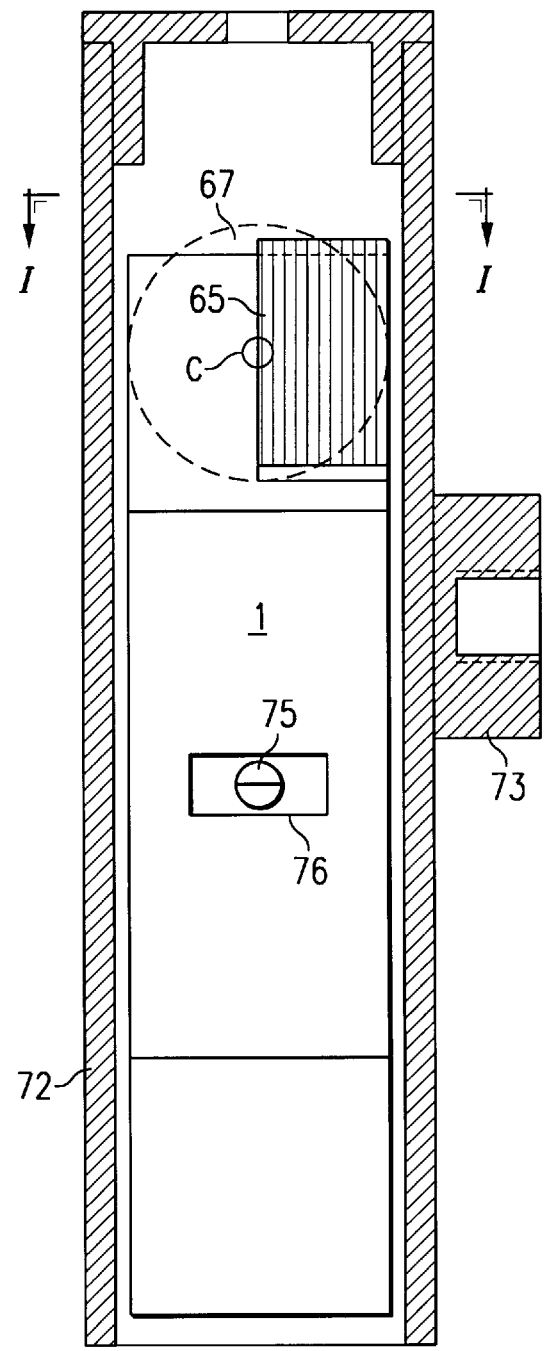
FIG. 22 is a longitudinal section of an optical square.
Figure 23:
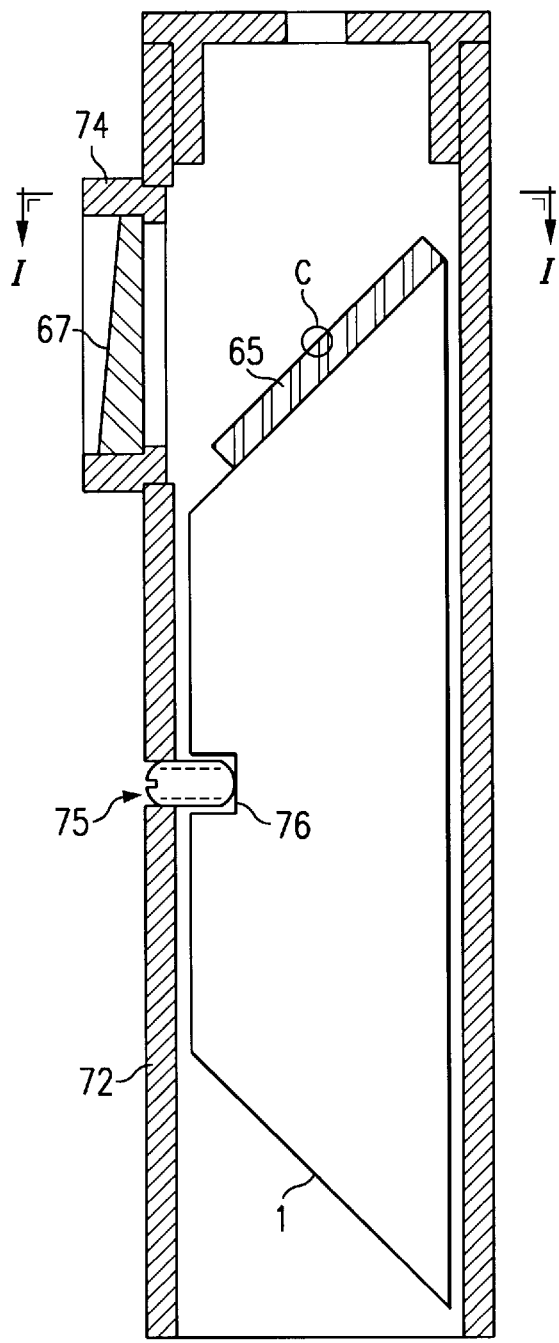
FIG. 23 is another longitudinal section of the square of FIG. 22.
Figure 24:
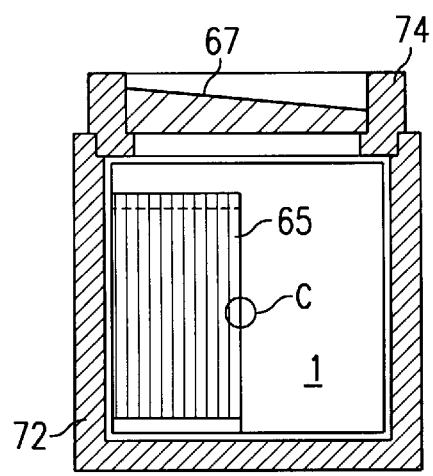
FIG. 24 is a cross section on the line A–B of FIGS. 22 and 23.
Figure 25A:
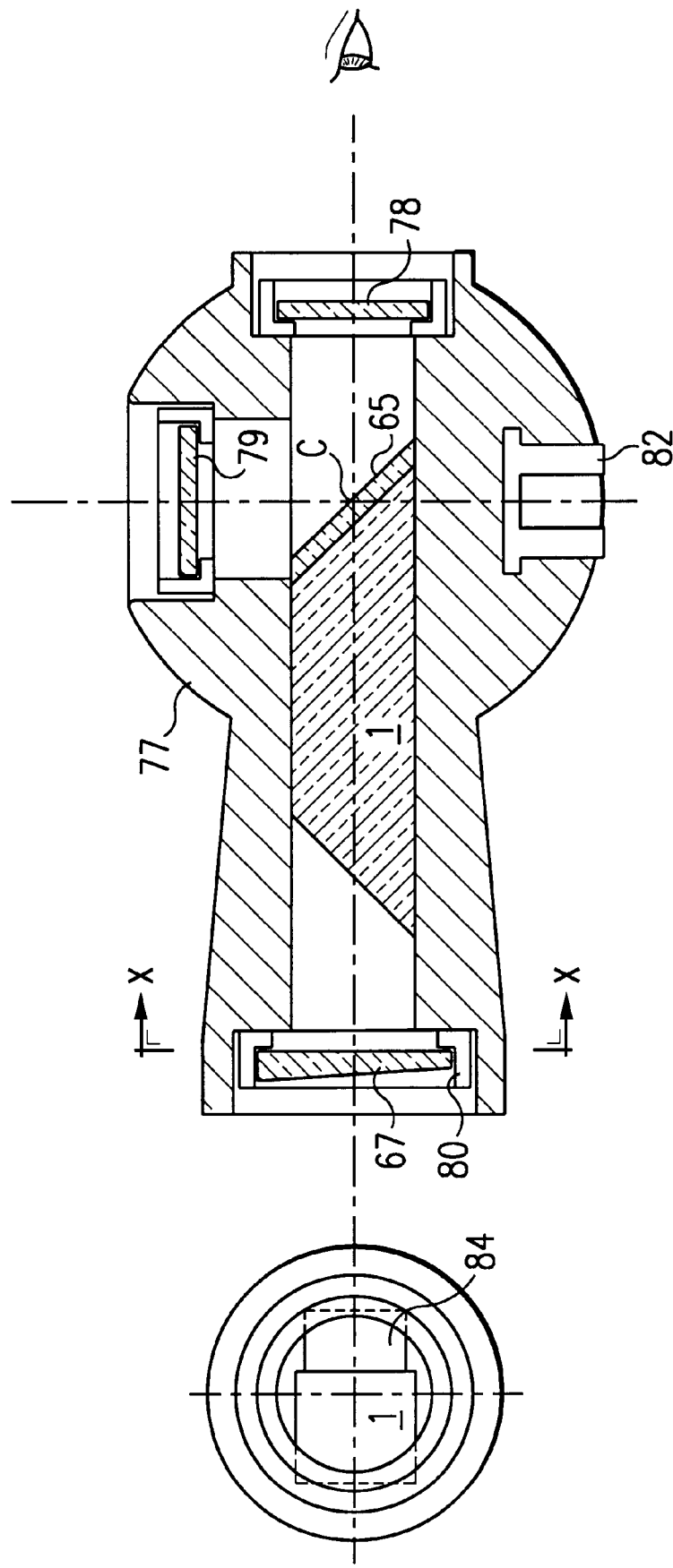
FIGS. 25a–c are diagrams showing one embodiment of an optical square.
Figure 25B:
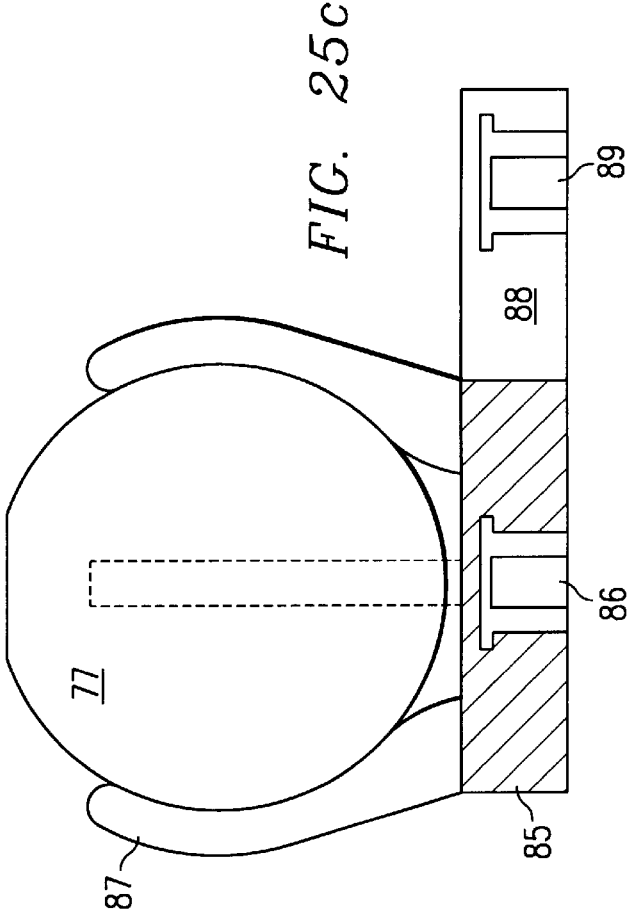
Figure 25C:
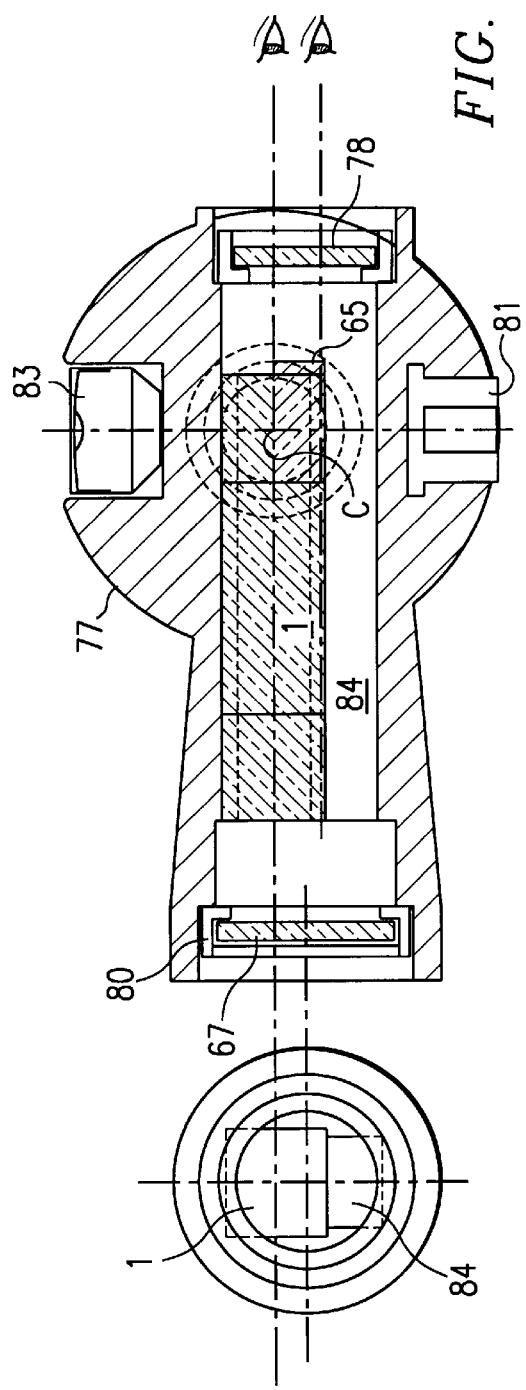
Figure 25D:
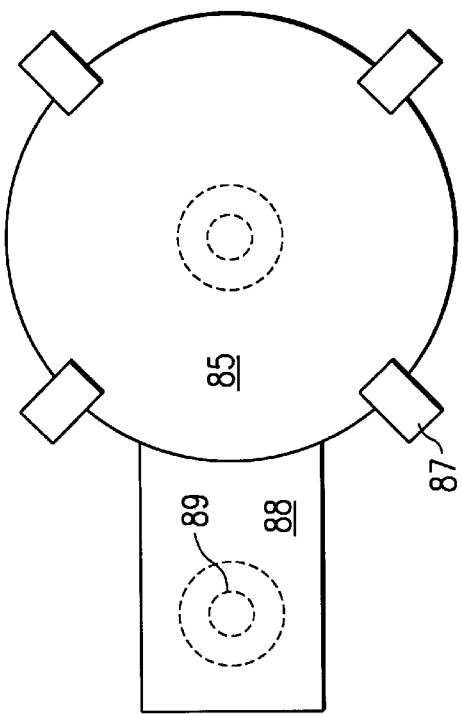

FIGS. 22, 23 and 24 show in slightly more detail an optical square corresponding to that of FIG. 18 and the same references are used for the basic components. The Dove prism 1 has a fairly close sliding fit into a square section housing 72, of metal or plastic material for example. This has a socket 73 for mounting the instrument on a tripod, and a cap 74 for retaining the compensating prism 67 which will be lockable at a set position once the setting up procedure is completed. A set screw 75 through the housing engages a recess 76 in the top of the Dove prism 1 when it is correctly positioned to hold it in place this being one of a number of ways of securing the prism. The point C which is to be the apex of the right angle is marked in a corresponding position on the upper and lower outsides of the casing. The design shown in FIGS. 22, 23 and 24 is fully functional and it is an acceptable mode of practice, providing a pocket-sized instrument.

Referring now to FIG. 25, an optical square is depicted that provides for setting out right angles in horizontal, vertical, or intermediate planes. This is the best mode of practicing the invention for an optical square. FIG. 25a shows a longitudinal section looking along the plane of the optical axis of the device, and a cross section near the front viewing aperture in which is fixed the compensating prism 67. FIG. 25b shows a longitudinal section looking down on the plane of the optical axis, and a cross section near the viewing aperture containing the compensating prism 67. FIG. 25c shows a device 85 which may be attached to a tripod via the threaded socket 86, and in which the optical square shown in FIG. 25 may be held firmly at any orientation.

The instrument has a case 77, which may conveniently be made of moulded plastic material, having a rear spherical part provided with windows 78 and 79, which can be securely held in place with plastic rings, for example. Window 78 allows the direct view of the target through the Dove prism 1 near the plane of the optical axis, and also allows a view alongside the prism 1 through the air space 84. A mirror 65 is adhered to the rear face of the prism 1, covering half of its width, as described in relation to FIGS. 18, 19, 22, 23, and 24. The optical centre of the instrument is indicated by C. The Dove prism 1 can be held inside the case 77 by means of a screw and slot system (not shown in FIG. 25), corresponding to items 75 and 76 in FIGS. 22 and 23, such that the optical centre C is held at a constant position inside the case. Two threaded sockets 81 and 82 permit attaching the device to a tripod. Socket 81 puts the plane of the optical axis of the instrument vertical as is required for setting out right angles in the horizontal plane, while socket 82 puts the plane of the optical axis horizontal as is required for setting out right angles in the vertical plane. An optional circular bubble level 83 may be provided to assist setting the instrument correctly when setting out right angles in the horizontal plane. Adjustment of the compensating prism 67 is done as described below in relation to FIGS. 26 or 27, after which it is locked into position in a variety of ways, including adhesives, or the application of heat to melt the case 77 and the plastic ring 80 containing 67 firmly together. The component 85 shown in FIG. 25c may again conveniently be made of moulded plastic material, and has a tripod socket 86. It is provided with four flexible claws 87, into which the case 77 of the instrument may be clipped firmly, but such that it can be adjusted so that right angles may be set out in any desired plane.

The use of the instrument is as already described in relation to FIGS. 18, 19, 21, 22, 23 and 24. However, an improvement in ease of use is allowed by the provision of the air space 84 alongside the Dove prism 1. By viewing the target (of the types shown in FIGS. 2 or 21, for example) simultaneously through and alongside the prism 1, it is then possible to adjust the position of the instrument case 77 in the clips 87 on component 85, such that the two views of the target are (a) near the optical axis of 1, and (b) are not rotated with respect to each other. Such rotation would occur if the plane of the optical axis of the Dove prism 1 was not exactly vertical for horizontal surveys, or was not exactly horizontal for vertical surveys.

A further aspect of the design is the provision of a sideways extension 88 to the component 85 into which the instrument case 77 may be fixed. This extension 88 has another tripod socket 89 fixed into it. By attaching the unit 85 to a tripod using socket 89 the other socket 86 is offset sufficiently from the tripod to allow a suitable plumb line to be attached to socket 86. This aligns the optical centre C of the instrument directly above the centre line of socket 86. The plumb bob can thus be used to indicate the position on the ground above which C is vertically situated. This greatly assists setting out right angles in any desired plane from a known datum on the ground. Since the datum is known with precision, the full attainable accuracy of the instrument may be realized.

FIG. 26 illustrates a setting-up procedure. A line 90, perhaps 10 meters in length, is stretched between two points 91 and 92. Instrument 93 is set up centrally on this line with the plane of its optical axis being vertically orientated, and compensating prism directed towards the points labeled 94 to 96. Targets such as that shown in FIG. 21 are set up at both of the points 91 and 92, and another one at some arbitrary point which will make an approximate right angle to the mid point of line 90. An observation is made and the lateral target is adjusted to point 94 where it appears to make an exact right angle with the target 91, for example. The instrument is then reversed and, if not set up correctly, then a target at point 96 will appear to give a right angle with the target at 92. The compensating prism is then adjusted and further observations are made until a target at 95 mid-way between the first two points 94 and 96 gives a right angle reading in both directions of observation along the line 90.

To avoid any parallax effects (which can be shown to be virtually negligible) it is best that the distance to the lateral target at point 94, 95 or 96 should be half the length of the line 90, and when surveying later with a correctly adjusted instrument, it is also best that the targets should be equidistant from the instrument.

Another way of setting up is shown in FIG. 27. Here the instrument 93 is provided with a pentaprism 97 as an accessory which will fit over the side window to redirect a beam parallel with the optical axis exactly at right angles through the window onto the mirror. Such prisms can be manufactured with great accuracy, and final calibration to give a deviation of 90 degrees plus or minus 0.1 minutes of arc can be done using a compensating prism adhered to the face of the pentagonal prism as previously described (but not shown in FIG. 27).

For setting up, a very distant object with a prominent vertical feature is observed, making the parallax angle A negligible. The compensating prism of the optical square is then adjusted until the split image obtained directly through the Dove prism and through the pentaprism and mirror has no discontinuity. A telescope may be used to increase the precision of this adjustment. In FIG. 27 the point labeled 98 represents a datum mark on the outside of instrument case, and corresponds to the optical centre C on the mirror 65 in FIGS. 22 and 25. It will be understood that the optical square may be used to set out right angles in any plane, and not just in the horizontal plane as is generally most commonly done.

In many surveying and other contexts it is required to check, or to set out, angles from the horizontal. It is convenient to use an optical system consisting of a Dove prism plus a mirror to deflect the line of sight to a suitable position, these items being fixed to a common support which is tilted at the required angle.

The angle required may be obtained by fixing the Dove prism/mirror unit, whose optics resemble those shown in FIG. 4(*a*) or 4(*b*) on top of a freely suspended pendulum whose oscillations are damped (using any convenient method so far described) but so that the Dove prism axis is inclined at the required angle to the horizontal, rather than being actually horizontal as is needed for a level surveying instrument. Then, using targets as shown in FIG. 2, alignment as at FIG. 2(*a*) is obtained only when the angle from target to Dove prism to the horizontal is correct.

Alternatively, the Dove prism may be fixed, together with the deflecting mirror, to a base plate provided with leveling screws and a precision spirit level vial, the latter indicating when the base plate of the unit is exactly level. This method is shown in FIG. 28. The Dove prism 1 and the mirror 99 are rigidly fixed to the base plate 100. The base plate 100 is provided with three adjustable screwed feet, 101, 102, two of which are shown, by means of which the base plate may be leveled sufficiently exactly. The mirror deflects the line of sight upwards to a convenient position and angle of view 104 for the inclined head of the user.

It will be understood that the inclined surface of the base plate 100, to which the Dove prism 1 and mirror 99 are fixed, may be provided with a horizontal pivot in the lateral plane, and an angular scale, so that its angle to the horizontal in the direction of observation can be adjusted, although FIG. 28 does not show this.

Once the instrument is correctly adjusted using the leveling screws 101, 102 and the precision spirit level vial 103, the Dove prism optical axis is inclined at the required angle to the horizontal. The target T is adjusted until a view as at FIG. 2(*a*) is seen, when T is then at the correct angle with respect to the point at which the rear-ward projection of the optical axis of the Dove prism intersects the approximately level floor on which the unit is placed; this point is marked as A in FIG. 28.

The above described instrument is a Dove prism version of a "clinometer," and should be very easy to use, and as accurate as the precision spirit level permits, which can be obtained giving level to a few arc seconds.

One application of this system is for checking the position of dart boards from the playing line. No absolute distance or height information for the dart board is given by this check of angle, but it is statistically unlikely that both height and distance will be in error so as to cooperate to give precisely the correct angle. Any angle error seen indicates that the dart board is not set up correctly. Setting the board at the correct height is most important for tournaments, and gives rise to much dispute. No floor is truly flat or horizontal, hence the use of such an instrument (whether the automatic or manually adjusted type) would be convenient. It would be necessary to position the unit on the floor using a measuring tape set to the hypotenuse distance from floor to dart board centre, and to fix a small target to the board bulls-eye.

Figure 29A:
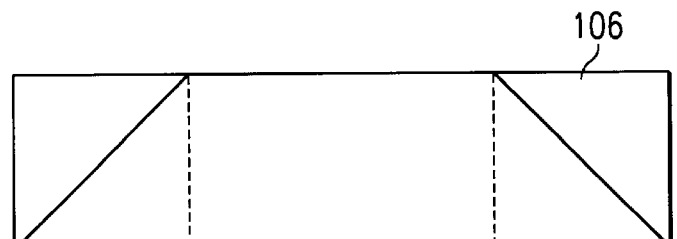
Figure 29B:
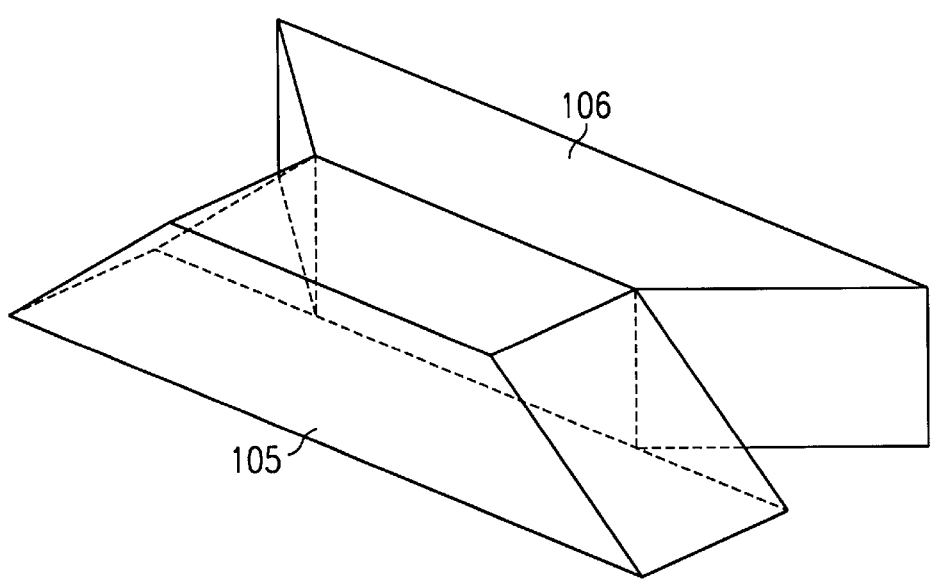

In many surveying and other contexts it is required to set out targets, or other objects, in a straight line, whether this line be inclined or not, and the optical device shown in FIGS. 29*a*–*b* facilitates this task. It may be described as a zero parallax, non-focusing, alignment device, which can be attached to an adjustable support such as a tripod.

Figure 29C:
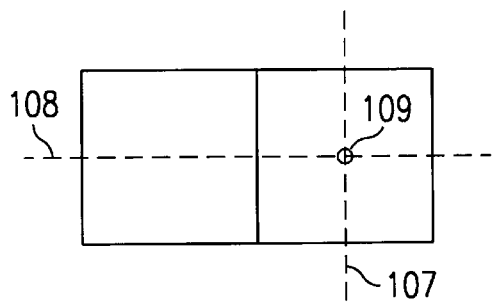

Two Dove prisms, 105 and 106 are rigidly fixed together, for example with optical adhesives, and joined so that their reflecting surfaces, or bases (items 3 in FIG. 1), are parallel in the longitudinal plane but at right angles in the lateral plane. The optical axis of prism 106 is the plane 107, indicated in FIG. 29(*c*), which is a view of the prism pair from the end near the eye. Similarly, the axis of prism 105 is the plane 108. The intersection of these planes 107 and 108 is a line in space, which is here shown in section as the point 109, and this line is the unique optical axis of the composite system of the two Dove prisms.

Figure 30:
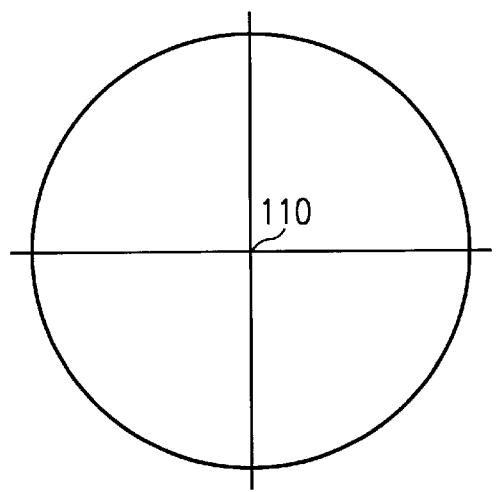
FIG. 30 is a diagram of a target used with the optical alignment instrument of FIG. 28.

Using a radially symmetrical target such as that shown in FIG. 30, the view of this seen through both Dove prisms together is only exactly like FIG. 30 if the axis 109 of the composite prism unit is directed precisely at the centre of the target, this being marked 110. Any other view means that the axis 109 does not intersect the centre 110. Rotation of the prism pair 105, 106 about their common axis will rotate the view seen but, apart from the rotation, an unaltered view of the target, as in FIG. 30, via the prisms, is only seen if the axis continues to intersect the target centre during rotation of the unit.

As an example of use, if a target of the form of FIG. 30 is set up at a known and required position, distant from the alignment device, and the latter is at a desired position also and adjusted on its support so that the view of the target is exactly like the target, then an optical straight line exists between target and device. Then a set of intermediate targets, or more distant ones, may be similarly aligned, with the device stationary, so that at the end all targets are co-linear.

It will be understood that if the prism pair is suspended from a freely hanging pendulum system, of any convenient type, so that the common axis 109 of the prisms is exactly vertical, then this constitutes a Dove prisms version of a device commonly referred to as an "optical plummet," which is frequently used in surveying to establish precisely over which point on the ground a surveying instrument is set.

Apart from the possible use of an auxiliary telescope, all the above devices are based on the use of the unassisted eye. The resolving power of a very good human eye is close to 0.5 arc minutes for a pair of point sources. However, all the instruments use targets in the form of a long line, and alignment is indicated by the co-linearity of the parts of the line seen through and alongside the Dove prism. The optical task therefore resembles that of setting a vernier on a micrometer. The term "vernier acuity" is used in this context, and this is considerably superior to the ordinary two-point-source acuity. Under the best conditions people can have a vernier acuity of between 5 and 10 arc seconds. This means that they can detect a misalignment of this order between two lines that are supposed to be co-linear, but are in fact not. Consequently, the accuracy of alignment claimed for Dove prism based levels (etc.), which is as good as 0.3 arc minutes, is fairly easily achieved, provided the illumination is adequate. Obviously, people with defective vision should wear their spectacles to obtain the best results.

For all instruments described above, if the case of the instrument such as an optical level is made watertight, it is then possible to do survey work under water. For this to be possible to the full attainable accuracy of the instruments the outer surfaces of the two viewing windows in the case must be exactly parallel in optical terms. For use in dark places, for example underwater, or in a mine, illuminated targets would be necessary.

In all survey work with the above described optical levels and other instruments, two people are involved. One observes through the instrument, while the other adjusts the target height on a graduated staff until the first person sees exact alignment, when the level reading is taken. It is quite feasible to devise a battery powered, remotely controlled, target on the staff, such that one man operation is possible.

What is claimed is:

1. A method for determining the axial relationship between first and second targets and an image inverter, the method comprising the steps of:
    viewing the first target through the image inverter for an inverted view of the first target;
    viewing the second target with a mirror associated with the image inverter for a reflected view of the second target; and
    determining the axial relationship between the first target, the second target and the image inverter by comparing the inverted view with the reflected view.

2. The method according to claim 1 wherein the image inverter comprises a Dove prism having an observer end, the observer end having a width, and wherein the mirror is provided over one-half the width of the observer end, the mirror having a reflective axis.

3. The method according to claim 2 wherein the Dove prism inverts the first target about an optical axis, and wherein the optical axis and mirror meet at an angle of approximately forty-five degrees.

4. The method according to claim 3 wherein the Dove prism has a base and an apex, and wherein each target comprises a vertical line, the method for determining a right angle from the line on the first target via the image inverter to the line on the second target, the method further comprising the steps of:
    rotating the Dove prism so that the base to apex direction is horizontal; and
    aligning the first target with the optical axis and second target with the reflective axis by comparing the vertical line of the inverted view with the vertical line of the reflected view.

5. The method according to claim 4 further comprising the step of improving the precision of the right angle by associating a compensating prism with the reflective axis.

6. The method according to claim 4 further comprising the step of improving the precision of the right angle by associating a compensating prism with the optical axis.

7. An apparatus for measuring an axial relationship, the apparatus comprising:
    an image inverter having an optical axis directed to view a target having a line,
    the image inverter forming an inverted view of the target adjacent to a direct view of the target,
    the line appearing continuous when simultaneously viewed directly and through the image inverter in the event that the optical axis is aligned with the line, the line appearing non-continuous when simultaneously viewed directly and through the image inverter if the optical axis is not aligned with the line;
    a bar coupled to the image inverter;
    a pivot pin coupled to the bar, the pivot pin having a sharpened point;
    a body;
    a cupped support coupled to the body, the cupped support formed to receive the pivot pin such that the image inverter is suspended from the body when the pivot pin is placed in the cupped support; and
    a damper coupled to the body for damping movement of the image inverter.

8. The apparatus according to claim 7 wherein the image inverter comprises a Dove prism.

9. The apparatus according to claim 7 wherein the target comprises a sight rail.

10. The apparatus according to claim 9 wherein the sight rail comprises a horizontal bar on a contrasting background.

11. The apparatus according to claim 8 wherein the optical axis is substantially horizontal for determining if the Dove prism and target are level.

12. The apparatus according to claim 8 further comprising a beam splitter associated with the optical axis Dove prism to support vertical surveys.

13. The apparatus according to claim 6 further comprising a gradient accessory associated with the Dove prism for tilting the optical axis in a graduated manner.

14. The apparatus according to claim 7 further comprising a mirror associated with the image inverter for allowing a user to look at the apparatus at an angle offset from the optical axis.

15. The apparatus according to claim 7 wherein the bar comprises a non-magnetic, conductive pendulum:
    and the damper comprises a magnetic damper.

16. An apparatus for measuring an axial relationship, the apparatus comprising:
    a first target having a line;
    a second target having a second line;
    an image inverter having an optical axis directed to view the first target; and a mirror associated with the image inverter, the mirror having a reflective axis, the reflective axis offset from optical axis by a predetermined angle, the reflective axis directed to reflect the second target wherein the axial relationship of the first target, the second target and the image inverter can be determined by comparing the view of the first target line and the reflection of the second target line.

17. The apparatus according to claim 16 wherein the predetermined angle is approximately a right angle.

18. The apparatus according to claim 17 further comprising a compensating prism for improving the precision of the right angle.

19. The apparatus according to claim 16 wherein the first target comprises a vertical bar and the second target comprises a vertical bar, the axial relationship forming a right angle when the first target bar and the second target bar align.

* * * * *